United States Patent [19]
Araki et al.

[11] Patent Number: 5,192,016
[45] Date of Patent: Mar. 9, 1993

[54] METHODS FOR MANUFACTURING TUBES FILLED WITH POWDERY AND GRANULAR SUBSTANCES

[75] Inventors: Nobuo Araki; Takeji Kagami; Yoji Chatani; Shunichi Kikuta; Iwao Yamada; Masao Kamada; Seiji Hashimoto; Shuichi Ueno, all of Tokyo; Takeshi Fukui, Fukuchiyama; Takumi Nakamura, Tokyo; Nobuo Mizuhashi; Yasushi Ishikawa, both of Sagamihara, all of Japan

[73] Assignees: Nippon Steel Corporation; Nippon Steel Welding Products & Engineering Co., Ltd., both of Tokyo, Japan

[21] Appl. No.: 835,957

[22] PCT Filed: Jun. 21, 1991

[86] PCT No.: PCT/JP91/00836
§ 371 Date: Feb. 21, 1992
§ 102(e) Date: Feb. 21, 1992

[87] PCT Pub. No.: WO91/19590
PCT Pub. Date: Dec. 26, 1991

[30] Foreign Application Priority Data

Jun. 21, 1990 [JP] Japan ................................. 2-161398
Jun. 21, 1990 [JP] Japan ................................. 2-161399
Jun. 25, 1990 [JP] Japan ................................. 2-164260

[51] Int. Cl.$^5$ .............................................. B23K 13/02
[52] U.S. Cl. ..................................... 228/147; 228/158; 228/223; 219/10.53; 219/61
[58] Field of Search ............... 228/147, 148, 156, 158, 228/223, 17.5, 41; 219/10.53, 61, 72, 73.2; 29/33 D

[56] References Cited

U.S. PATENT DOCUMENTS

| | | | |
|---|---|---|---|
| 4,629,110 | 12/1986 | Holmgren et al. | 228/148 |
| 4,673,121 | 6/1987 | Holmgren | 228/148 |
| 4,811,889 | 3/1989 | Dackus et al. | 228/148 |

FOREIGN PATENT DOCUMENTS 54-109040 8/1979 Japan.
60-234794 11/1985 Japan.
60-234795 11/1985 Japan.

Primary Examiner—Samuel M. Heinrich
Attorney, Agent, or Firm—Wenderoth, Lind & Ponack

[57] ABSTRACT

A method of manufacturing tubes filled with powdery and/or granular substances, such as flux-cored welding wires. A tube filled with a powdery and/or granular substance is continuously manufactured by forming a metal strip being fed in its longitudinal direction into an unwelded tube (1a) using forming rolls (2), feeding a powdery and/or granular substance (F) into the unwelded tube (1a) being formed through its opening, butt-welding together fringing edges of the opening, and reducing the diameter of the welded tube (1b). An allowable minimum heat input below which cold cracking occurs and a maximum allowable heat input above which spatters whose diameter is not smaller than 0.83 times the inside diameter of the finished tube are generated are determined in advance, and the butt welding is performed with a heat input larger than the allowable minimum heat input and smaller than the allowable maximum heat input. This eliminates the risk of breaking in reducing the diameter of the welded tube (1b) filled with the powdery and/or granular substance (F).

13 Claims, 9 Drawing Sheets

METHODS FOR MANUFACTURING TUBES FILLED WITH POWDERY AND GRANULAR SUBSTANCES

BACKGROUND OF THE INVENTION

1. Field of the Invention

This invention relates to methods for manufacturing tubes of carbon steel, stainless steel, copper alloy, aluminum alloy and other metals filled with a powdery and/or granular substance.

The powdery and granular substances are powders, granules or their mixtures, such as welding fluxes, oxide-based superconductors and steelmaking additives. This invention is used in the manufacture of wires containing welding fluxes, wires containing oxide-based superconductors and other tubes containing a powdery and/or granular substance.

2. Description of the Prior Art

Seamless wire containing welding flux is an example of tubes filled with a powdery and/or granular substance. The seamless wire is made by slitting steel strip into desired widths and gradually forming the slit strip formed into a U-shape, and then into an O-shape, using a series of forming rolls. Halfway in the forming process, a flux is fed from a feeder into the bottom of the U-shaped strip through an opening extending along the length thereof. When the U-shaped strip is formed into an O-shape, the meeting edges of the strip are welded together to close the opening. Then, the diameter of the welded shell is reduced. After being annealed as required, the tube filled with the flux is drawn into a wire of the desired diameter and coiled into the desired product form.

Low-frequency welding, high-frequency induction welding and high-frequency resistance welding are extensively used in the manufacture of tubes filled with a powdery and/or granular substance. In any of these welding methods, the edges of the strip fringing the opening are heated to the melting temperature by a low-frequency or high-frequency current and then pressed until they meet and form the weld by a pair of squeeze rolls.

The welded tubes filled with the flux may break in the subsequent process in which their diameter is reduced by rolling and drawing. This break is considered to result from the following cause. When welding is performed, some of the oxide or silicate in the flux adheres to the fringing edges of the opening in the formed tube. At the welding point, air flows outside from the formed tube through the opening as a result of the expansion caused by the collision of the air carried in by the approaching formed tube and the air flowing backward from the size-reducing point and by the heat of welding. The stream of air thus created blows up part of the flux, which adheres to the fringing edges of the opening in the formed tube. Some of the flux jumping up under the influence of the vibration of the approaching formed tube too adheres to the same area. Because of a magnetic field built up by the welding current at the welding point, in addition, the fringing edges of the formed tube serve as a magnetic pole. Therefore, the magnetic force of the fringing edges attracts the ferromagnetic ingredients of the flux. At this time, the ferromagnetic ingredients take some nonmagnetic components with them to the fringing edges. The flux thus adheres to the fringing edges fuses into the weld to form nonmetallic inclusions detrimental to the weld. This welding defect leads to cracking or breaking in the subsequent size reduction process.

The "Method and Apparatus for Manufacturing Filler Wire" disclosed in Japanese Provisional Patent Publication No. 234795 of 1985 offers a solution for this type of problem. This technology prevents the blow-up of the powder by drawing in the stream of air created in the formed tube upstream of the welding or roll-press zone. The "Method of Manufacturing Filler Wire" disclosed in the Japanese Provisional Patent Publication No. 234792 of 1985 offers another solution. This technology forms a lower layer a ferromagnetic or ferrite-based substance and an upper layer of a nonmagnetic substance so that the latter inhibits the attraction of the former to the fringing edges of the opening. The "Composite Welding Wire" disclosed in the Japanese Provisional Patent Publication No. 234794 of 1985 discloses a still another solution. This technology fills a substantially nonmagnetic powder whose relative magnetic permeability is not higher than 1.10 to prevent the powder from getting magnetically attracted to the fringing edges of the opening. The "Method of Manufacturing Tubes Filled with Powders" disclosed in the Japanese Provisional Patent Publication No. 109040 of 1979 relates to a technology that does not fill a tube 100% with a powder in order to leave such a space or distance between the weld and the surface of the powder as is large enough to keep the blown-up powder away from the fringing edges of the opening.

The "Method of Manufacturing Wires Filled with Powders" disclosed in the Japanese Provisional Patent Publication No. 125436 of 1977 exhibits another technology that granulates all or part of those ingredients of a powder whose size is finer than 250 mesh with a suitable binder. This technology is intended for the improvement of feedability through granulation, rather than the prevention of the presence of nonmetallic inclusions in the weld of a powder-filled tube. But the increased powder particle size achieved by granulation seems to have an effect on the prevention of the blow-up of the powder exposed to a stream of air.

Even after the introduction of the aforementioned weld improving technologies, however, breakage have continued to occur in the tube-size reducing process, entailing a drop in working efficiency and project yield. Breakage has occurred more frequently as the amount of drawing and size reduction increased. The tendency has been particularly pronounced when the diameter Of the final product was 1.6 mm or under.

The technology to suck the stream of air generated in the tube sometimes produces an adverse effect as a new air stream caused by the suction blows up, rather than settles, the powder inside. The technology to spread a layer of a nonmagnetic material on top of a layer of a ferromagnetic or ferrite-based material and the technology to fill a substantially nonmagnetic powder cannot prevent the nonmagnetic powder from getting blown up or jumping up under the influence of the vibration of the tube. Especially when the above materials are spread in two layers, one on top of the other, the nonmagnetic powder in the upper layer springs up because of the vibration of the lower layer caused by the alternating flux passing therethrough. The amount of the powder fed into a tube must be large enough to fill a certain percentage of the cross-sectional area thereof. Therefore, the space left between the weld and the surface of the powder is not always allowed to be large enough to prevent the powder from getting carried to the fringing edges of the opening by the stream of air, the vibration of the tube and the magnetic force of the fringing edges of the opening. Even when finer ingredients of a powder are granulated into larger particles, the ferromagnetic ingredients in the granulated material are attracted to the fringing edges of the opening. Together with the ferromagnetic ingredients, such nonmagnetic ingredients as might form nonmetallic inclusions can sometimes adhere to the fringing edges of the opening.

During the manufacture of tubes filled with a powdery and/or granular substance, large sagging beads are often formed on the inside of the weld. While the beads formed on the outside can be removed by scarfing, but those on the inside of the tubes filled with a powdery and/or granular substance cannot be removed. Tubes carrying such large internal beads have often cracked in the vicinity of the weld in the size-reduction process or broken in the drawing process.

The "Method of Manufacturing Welding Wires Filled with Flux" disclosed in the Japanese Provisional Patent Publication No. 240199 of 1987 offered a solution for the problems just described. This technology uses a welded tube with such internal beads whose width and height, together with the angle formed between their root and the inner surface of the tube, are kept within certain limits. With a powder of flux filled by the vibrating method according to the Japanese Patent Publication No. 30937 of 1970 or other proper method, the tube is drawn to a wire of the desired diameter. If their width etc. are kept within certain limits, the internal beads are not pressed into the tube wall even when they are deformed in the drawing process. Such beads also prevent the occurrence of notches at their root and cracks in the vicinity of the weld.

The inventors are aware that internal beads of satisfactory shape and size can be obtained even when welding is performed with an inverted-V groove so long as the angle of the groove and the amount of heat input are kept within proper limits. The groove angle varies with the forming schedule of the tube. As the edges of the formed tube are butted and continuously welded together, it is practically impossible to measure the groove angle of tubes with small wall thickness and small diameter. Their groove angle must be estimated on the basis of their forming schedule. Even the estimation of the groove angle is difficult with the tubes filled with a powdery and/or granular substance covered by this invention as their diameter and wall thickness at the butt welding point are very small (e.g., 21.7 mm in outside diameter and 2.2 mm in wall thickness). The proper heat input that forms satisfactory internal beads varies with the groove angle as well. Therefore, the conditions of heat input derived from the estimated groove angle have involved such considerable errors that the shape and size of internal beads have varied greatly.

The Japanese Provisional Patent Publication No. 240199 of 1987 shows an example of welding with an inverted-V groove (only one example with a groove angle of 15 degrees). But it neither discloses nor suggests the welding conditions, including the groove profile, that will provide satisfactory internal beads.

SUMMARY OF THE INVENTION

The object of this invention is to provide methods for manufacturing tubes filled with a powdery and/or granular substance without causing breakage in the size-reduction process.

The inventors discovered that the breakage in the size reduction process is ascribable to the mixing of the spatter expelled during welding with the powdery and/or granular substance in the tube. The spatters are so hard that they remain uncrushed even after the tube has been subjected to rolling or drawing. The presence of the spatters causes the tube, which is prevented from changing its shape, to break. It was also discovered that no such breakage occurs if the size of the mixed spatters is smaller than a certain level. This invention is based on the findings just described.

A method of manufacturing tubes filled with a powdery and/or granular substance comprises the continuous steps of forming a metal strip being fed in the longitudinal direction thereof into an unwelded tube by means of forming rolls, feeding a powdery and/or granular substance into the unwelded tube through an opening therein in the course of the forming process, butt welding the fringing edges of the opening together, and reducing the diameter of the welded tube. The minimum allowable heat input below which cold cracking occurs and the maximum allowable heat input above which spatters not smaller than 0.83 times the inside diameter of the finished tube are expelled in the butt welding process are determined beforehand. Butt welding is then performed with a heat input that is greater than the minimum allowable heat input and smaller than the maximum allowable heat input. It is preferable to weld with a heat input that is smaller than the minimum heat input at which spattering begins to be observed. The minimum allowable heat input, maximum allowable heat input and minimum heat input at which spattering begins to be observed can be empirically determined. When the heat input exceeds the minimum heat input at which spattering begins to be observed, the number of spatters expelled increases sharply with increasing heat input.

Because welding according to this invention is performed with a heat input smaller than the maximum allowable heat input, however, the size of the spatters mixing with the powdery and/or granular substance in the tube is limited. This eliminates the spatter-induced breakage that might otherwise occur when the diameter of the tubes filled with the powdery and/or granular substance is reduced. Also, welding with a heat input greater than the minimum allowable heat input eliminates cold cracking. The result is an improvement in the working efficiency and product yield in the manufacture of tubes filled with a powdery and/or granular substance. It is of course desirable to perform welding with a heat input smaller than the minimum heat input at which spattering begins to be observed. The powdery and/or granular substance may be fed into the unwelded tube either as powder or with all or part of powder granulated.

In a method in which the meeting edges of the formed tube are butt welded together with the heat input smaller than the maximum allowable heat input mentioned above, part of the powdery and/or granular substance fed into the unwelded tube that is substantially nonmagnetic and forms nonmetallic inclusions in the weld may be granulated. Here, the substantially nonmagnetic powder is one whose relative magnetic permeability is not higher than 1.10.

When a powder is granulated, the weight of each particle increases. The heavier particles are neither blown up by a stream of air nor caused to jump up under the influence of the vibration of the tube to such an extent as to reach the edges of the opening. Having a smooth spherical surface, in addition, the granulated particles are less adhesive to the ferromagnetic constituents of the powder. Therefore, they are seldom taken by the ferromagnetic ingredients to the fringing edges of the opening. Also, they do not break when the powder is fed into the formed tube. As a consequence, no crack in the weld or no breakage of the tube occurs when the diameter Of the tube filled with the powdery and/or granular substance is reduced Or the tube is drawn into a wire. Some of the ferromagnetic ingredients in the powder may adhere to the fringing edges of the opening and fuse into the weld, but they do not form nonmetallic inclusions.

In the method in which the meeting edges of the formed tube are butt welded together with the heat input smaller than the maximum allowable heat input described above, the tube is welded so that the meeting edges are fused and joined together from the outside to the inside of the tube along a substantially straight line (hereinafter called the welding finishing line) that is inclined at an angle of $\theta(10°<\theta<90°)$ with respect to the axis of the tube.

Because the fusion and joining of the meeting edges proceed from the outside to the inside of the tube, the molten metal does not hang down from the inner surface of the tube to form large beads. Internal beads of proper shape and size are obtained so long as the angle of inclination of the welding finishing line is kept within the range of $10°<\theta<90°$.

Because the angle of inclination of the welding finishing line can be measured, the forming schedule, and the heat input conditions, can be determined on the basis of the actually measured angle of inclination. This permits reducing the variation in the shape and size of internal beads, which, in turn, is conductive to the forming of satisfactory beads. The result is the elimination of the breakage of tubes filled with a powdery and/or granular substance and an improvement in the working efficiency and product yield in their manufacture.

DESCRIPTION OF THE PREFERRED EMBODIMENTS

The following are specific embodiments of the manufacture of flux-cored seamless welding wires.

Figure 1:
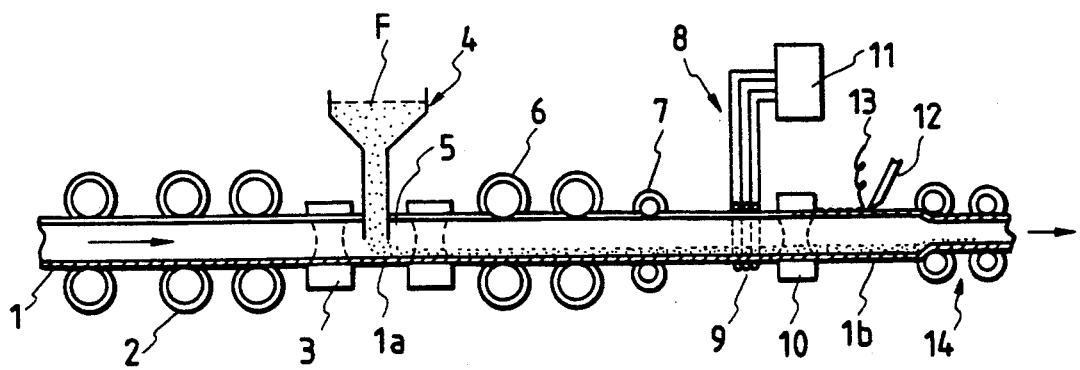
FIG. 1 shows the principal parts of an apparatus for manufacturing flux-cored seamless welding wires according to the method of this invention.

FIG. 1 shows the principal parts of an apparatus for manufacturing flux-cored seamless welding wires.

As shown in FIG. 1, forming rolls 2, side rolls 3 and a flux feeder 4 are disposed in the direction of the travel of the metal strip. Preforming rolls (not shown) are disposed upstream of the forming rolls 2. Flux F is fed into an unwelded tube 1a being formed from between the side rolls 3. The unwelded tube 1a carrying the flux F therein enters a welding zone after passing fin-pass rolls 6 and seam guide rolls 7. A high-frequency induction welder 8 has a work coil 9 and squeeze rolls 10. A power supply 11 supplies a high-frequency welding current of, for instance, 250 to 800 kHz to the work coil 9. The units just described are all of conventional types. A cutting tool 12 removes the excess bead from the outer surface of a welded tube 1b which is then rolled by a series of rolling rolls 14 and reduced to the desired product size by a drawing apparatus including an annealing unit (not shown).

Embodiment I

Butt welding according to this invention is performed with a heat input smaller than the maximum allowable heat input or the minimum heat input at which spattering begins to be observed. The minimum heat input at which spattering begins to be observed can be determined as follows. When the heat input is gradually increased while keeping the welding speed constant, spattering from the weld begins to occur. Spattering can be easily observed with the naked eye. The heat input at the point at which spattering is first observed (hereinafter called the spattering starting point) is taken as the minimum heat input at which spattering is observed. The amount of heat input can be indirectly learnt from the output (kVA) of the welding machine. To achieve a more quantitative observation of the spattering starting point, changes in the temperature (measured with a radiation pyrometer), brightness and other variables at or around the weld and the changing pattern of frequency corresponding to the gradual increase in the output (kVA) of the welding machine are determined. Then, the spattering starting point can be easily determined by counting the number of spatters existing in the tube welded with different outputs. The point at which the number of spatters increases sharply is the spattering starting point. The relationship between the size of spatters and the amount of heat input can be determined in a similar way. After determining spattering starting point and the output of the welding machine, temperature, brightness and other variables and the changing pattern of frequency corresponding to the size of spatters, the maximum allowable heat input is determined by observing the individual variables and the changing pattern.

Cold cracking occurs in the weld when heat input is too small. The heat input that causes cold cracking can be readily empirically determined as an output (kVA) of the welding machine. As in the above case, the variables such as brightness and the changing pattern of frequency are determined in advance, and then the minimum allowable heat input is determined by observing the individual variables and the changing pattern.

Figure 2:
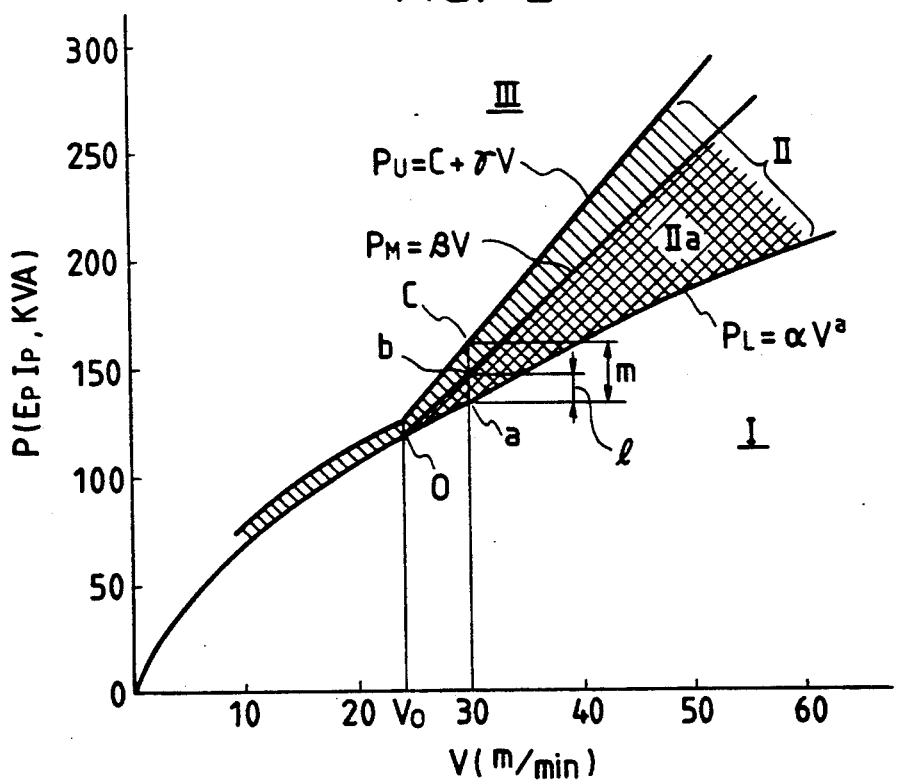
FIG. 2 graphically shows the relationship between the range of heat input and the varying welding speed.

The allowable heat input varies not only with the diameter and wall thickness of tubes but also with the welding speed. FIG. 2 shows the relationship between the varying welding speed and the range of the allowable heat input. In the figure, region I under curve $P_L$ is an area in which cold cracking occurs. The curve $P_L$ is approximately expressed as $P_L = \alpha V^a$, in which exponent a takes a value of about 0.6. Line $P_U$ shows the minimum heat input at which spatters not smaller than 0.83 times the inside diameter of the finished tube are expelled. Within the range in which the welding speed is not higher than $V_0$ (which is the welding speed at point 0 at which the curve $P_L$ and the line $P_M$ intersect), the line $P_U$ is a curve that runs above the curve $P_L$ substantially therealong. Within the range in which the welding speed exceeds $V_0$, the line $P_U$ becomes a straight line that is approximately expressed as $P_U = C + \gamma V$. Region II between the curve $P_L$ and the line $P_U$ is an area in which neither cold cracking nor the expelling of spatters not smaller than 0.83 times the inside diameter of the finished tube occurs. Straight line $P_M$ showing the minimum heat input at which spattering begins to be observed is approximately expressed as $P_M = \beta V$ ($\beta \leq \gamma$). Region II$_a$ between the curve $P_L$ and the straight line $P_M$ is an area in which neither cold cracking nor spattering is observed. Productivity increases with increasing welding speed which, however, is limited by the feed rate of the powdery and/or granular substance into the unwelded tube, capacity of the welding machine, and other factors. On the other hand, smaller heat input permits greater energy saving. But a large enough heat input must be chosen in the allowable region mentioned before to provide a margin to cope with variations in the welding speed, power supply voltage and other welding conditions.

Now the results of cracking tests and drawing on tubes for flux-cored welding wires manufactured with the apparatus just described with varying amounts of heat input.

A 2.2 mm thick steel strip was formed into a tube having an outside diameter of 21.7 mm and an inside diameter of 17.3 mm. With a flux filled with a filling ratio of 12% ±1% halfway in the forming process, the meeting edges of the unwelded tube was continuously butt welded. The butt welding was performed at a welding speed of 30 m/min., with a distance of 25 mm left between the work coil and the welding point, and with an apex angle of 7 degrees. After its outside diameter has been reduced to 12.5 mm through a series of rolling rolls, the welded tube was coiled up. After annealing, the welded tube was reduced to the final product having an outside diameter of 1.2 mm and an inside diameter of 0.6 mm.

Table 1 shows the results of the cracking tests and drawing.

TABLE 1

| Heat Input (kVA) | Measured Temperature (°C.) | Incidence of Cold Cracking (%) | No. of Spatters Expelled in Tube | Breakage during Drawing | Rating |
|---|---|---|---|---|---|
| 118 | 1130 | 100 | 0 | None | X |
| 120 | 1150 | 100 | 0 | None | X |
| 122 | 1200 | 70 | 0 | None | X |
| 125 | 1230 | 30 | 0 | None | X |
| 127 | 1250 | 5 | 0 | None | X |
| 128 | 1260 | 0 | 0 | None | O |
| 129 | 1270 | 0 | 0 | None | O |
| 135 | 1300 | 0 | 0 | None | O |
| 141 | 1340 | 0 | 0 | None | O |
| 145 | 1370 | 0 | 90 | None | O |
| 147 | 1420 | 0 | 148(0) | None | O |
| 150 | 1450 | 0 | 251(0) | None | O |
| 153 | 1490 | 0 | 904(102) | Occurred | X |

In the table, "Heat Input" is the heat input (kVA) expressed in terms of the output of the welding machine, "Measured Temperature" is the temperature of the weld measured with a radiation pyrometer at a point about 10 mm downstream of the welding point, "Incidence of Cold Cracking" is the percentage for 10 specimens having an outside diameter of 21.7 mm and a length of 50 mm, and "Number of Spatters in the Tube" is the number of spatters not smaller than 300 µm that are present in a 10 m long segment of a specimen having an outside diameter of 12.5 mm. The figures in parentheses show the number of spatters not smaller than 500 μm (= the inside diameter of the finished tube×0.83).

Figure 3:
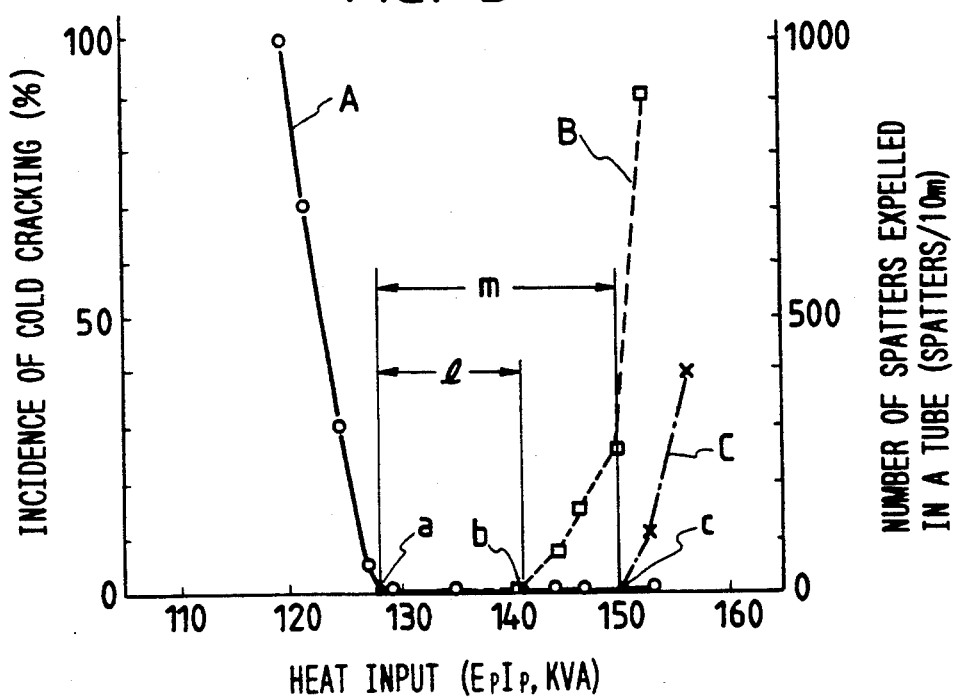
FIG. 3 graphically shows the relationship among the heat input, incidence of cold cracking and number of spatters expelled in the tube.

FIG. 3 graphically shows the obtained results. Broken line A shows the incidence of cold cracking. Cold cracking ceased to occur when the heat input exceeded 128 kVA (at point a). Dotted line B shows the number of spatters not smaller than 300 μm that occurred in a 10 m long segment of the tube. Spattering began to be observed when the heat input reached 141 kVA (at point b). The number of spatters increased sharply when the heat input exceeded 141 kVA. The point b at which spattering started could be determined easily. Dot-dash line C shows the number of spatters not smaller than 500 μm that occurred in a 10 m long segment of the tube. Spatters not smaller than 500 μm started to occur when the heat input reached 150 kVA (at point c). The points a, b and c and the regions 1 and m in FIG. 3 correspond to those in FIG. 2. The following values were obtained when the welding speed was varied in the equations expressing the allowable ranges of heat input. $P_L = 16.6 \, V^{0.6}$, $P_U = (-16.3) + 5.56 \, V$, and $P_M = 4.69 \, V$.

Embodiment II

In manufacturing the powder-cored wire described hereunder, substantially nonmagnetic ingredients of the powder to be fed into the unwelded tube which form nonmetallic inclusions in the weld are granulated before being fed into the tube. The powders that must be granulated are such nonferromagnetic oxides, silicates, carbonates, fluorides, alloy additives and deoxidizers as rutile sand, magnesia clinker, zircon sand, potassium titanate, magnesium aluminate, manganese silicate, some alloys of iron, nickel and cobalt. Some examples of iron alloys are given below.

Fe-Al alloys containing not less than 18% aluminum
Fe-Cr alloys containing not less than 40% chromium
Fe-Mn alloys containing not less than 6% manganese
Fe-Mo alloys containing not less than 46% molybdenum
Fe-Nb alloys containing not less than 2% niobium
Fe-Si alloys containing not less than 33% silicon
Fe-Ti alloys containing not less than 23% titanium
Fe-V alloys containing not less than 35% vanadium
Fe-W alloys containing not less than 33% tungsten
Fe-B alloys containing not less than 33% boron The iron alloys listed above are nonmagnetic. But they become ferromagnetic when the content of aluminum and other alloying elements falls below the specified percentages. It is preferable not to use such ferromagnetic iron alloys that involve the risk of forming nonmetallic inclusions, though the risk depends on the content of alloying elements.

Only finer ingredients of the powder, such as those which are finer than 145 meshes (105 μm), may be granulated. Granulation is achieved by such conventional methods as the pan amalgamation process. The granulated particles may be fired at a temperature of 400° to 500° C. until their moisture content falls below 0.1%.

The size of the granulated particles should preferably be of the order of 145 meshes (105 μm) to 20 meshes (840 μm). Particles finer than 145 meshes tend to get blown up by a stream of air or adhere to the ferromagnetic powder because of intermolecular force or Coulomb force (exerted by the particles that are charged by friction or fracture). Particles coarser than 20 meshes tend to break when they are fed into the tube, thereby damaging the uniformity of powder distribution in the tube, lowering the yield and efficiency in the granulation and firing processes and increasing the overall production cost.

The ferromagnetic ingredients in the powder may be either granulated or not. When granulated, they must be granulated separately from the aforementioned ingredients that will form nonmetallic inclusions. If the two ingredients are granulated together, magnetic force attracts the powder to the fringing edges of the opening, whereby even ingredients forming nonmetallic inclusions are taken into the weld. The size of the ferromagnetic ingredients should preferably be of the order of 200 meshes (74 μm) to 80 meshes (177 μm). If they are finer than 200 meshes, the quantity of ferromagnetic ingredients adhering to the fringing edges of the opening by the action of magnetic force and a stream of air increases, whereby the shape of beads at the weld and the uniformity of the filled powder are spoiled. If they are coarser than 80 meshes, complete fusion of the weld and uniform distribution of the filled powder are unattainable.

Using the apparatus shown in FIG. 1, flux-cored tubes having an outside diameter of 10 to 25 mm were prepared and then drawn into flux-cored seamless welding wires under the following conditions.

While Table 2 shows the composition of the steel strips and fluxes, Tables 3 and 4 show the particle size of the granulated flux powders.

TABLE 2

|  |  | Steel Strip | |
|---|---|---|---|
|  |  | Carbon Steel | Stainless Steel |
|  |  |  | Flux |
|  |  | Composition 1 (%) | Composition 2 (%) |
| Group A | Iron powder (total Fe: 95% minimum) | 10 | — |
|  | Nickel powder (Ni: 97% minimum) | — | 10 |
| Group B | Rutile sand | 46 | 36 |
|  | Silica sand | 8 | 6 |
|  | Zircon sand | — | 13 |
|  | Chromium | — | 25 |
|  | Manganese | — | 6 |
|  | Ferromanganese | 8 | — |
|  | Ferrosilicon | 5 | — |
|  | Silicomanganese | 19 | — |
|  | Others | 4 | 4 |
|  | Total | 100 | 100 |

Group A: Material comprising ferromagnetic metals
Group B: Substantially nonmagnetic powder of materials forming nonmetallic inclusions in welded joints

TABLE 3

| | Classification | | | Embodiments of This Invention | | | | | | | | | Conventional Products | | | Trial Products for Comparison | |
|---|---|---|---|---|---|---|---|---|---|---|---|---|---|---|---|---|---|
| Group | Material Specification Conformance | Granulated/ Fired | Particle Size | 1 | 2 | 3 | 4 | 5 | 6 | 7 | 8 | 9 | 10 | 11 | 12 | 13*[1] | 14*[2] |
| A | Not conformed | — | — | ○ | ○ | ○ | — | — | — | — | — | — | ○ | — | — | — | — |

TABLE 3-continued

| Group | Material Specification Conformance | Granulated/Fired | Particle Size | 1 | 2 | 3 | 4 | 5 | 6 | 7 | 8 | 9 | 10 | 11 | 12 | 13 |
|---|---|---|---|---|---|---|---|---|---|---|---|---|---|---|---|---|
| | Conformed | No | 20 meshes to dust*3 | — | — | — | ○ | ○ | ○ | ○ | — | — | — | ○ | — | ○ | — |
| | | No | Finer than 80 meshes | — | — | — | — | — | — | — | ○ | ○ | — | — | ○ | — | — |
| B | Conformed | No | 20 meshes to dust*3 | — | — | — | — | — | — | — | — | — | ○ | ○ | ○ | — | — |
| | | Granulated | 20 meshes to dust*4 | ○ | — | — | ○ | — | — | — | — | — | — | — | — | — | — |
| | | | Coarser than 145 meshes | — | ○ | — | — | ○ | — | ○ | — | ○ | — | — | — | — | — |
| | | Granulated and fired | 20 meshes to dust*5 | — | — | — | — | — | ○ | — | ○ | — | — | — | — | — | — |
| | | | Coarser than 145 meshes | — | — | ○ | — | — | — | ○ | — | ○ | — | — | — | — | — |
| Flattening close test | | | | △ | ○ | ◎ | △ | ○ | ○ | ○ | ◎ | ◎ | X | X | X | ○ | ◎ |
| Breakage | | | | ○ | ◎ | ○ | ○ | ○ | ◎ | ◎ | ◎ | ◎ | X | X | X | ○ | ◎ |
| Overall evaluation | | | | C | B | B | C | C | B | B | A | A | E | E | D | C | A |

*1 Packed with flux consisting of iron powder only (80 meshes to dust)
*2 Empty tube
*3 Unprocessed powder
*4 As granulated
*5 As granulated and fired Flattening close test:
◎ All of ten specimens are sound.
○ Of ten specimens, one or two have very minute defects, and the rest are sound. (The minute defects do not cause breakage in subsequent processes.)
△ Of ten specimens, one or two have small defects visible to the naked eye, and the rest are sound.
X Of ten specimens, two or more have cracks visible to the naked eye.

Breakage:
◎ No breakage
○ One to three breakages per 10 tons
X Four or more breakages per 10 tons Overall evaluation:
A Excellent
B Good
C Fair
D Poor
E Extremely poor
A to D: Acceptable
E: Rejected

TABLE 4

| | Classification | | | Embodiments of This Invention | | | | | | | | | Conventional Products | | | Trial Products for Comparison |
|---|---|---|---|---|---|---|---|---|---|---|---|---|---|---|---|---|
| Group | Material Specification Conformance | Granulated/Fired | Particle Size | 1 | 2 | 3 | 4 | 5 | 6 | 7 | 8 | 9 | 10 | 11 | 12 | 13*1 |
| A | Not conformed | — | — | ○ | ○ | ○ | — | — | — | — | — | — | ○ | — | — | — |
| | Conformed | No | 20 meshes to dust*2 | — | — | — | ○ | ○ | ○ | ○ | — | — | — | ○ | — | ○ |
| | | No | Finer than 80 meshes | — | — | — | — | — | — | — | ○ | ○ | — | — | ○ | — |
| B | Conformed | No | 20 meshes to dust*2 | — | — | — | — | — | — | — | — | — | ○ | ○ | ○ | — |
| | | Granulated | 20 meshes to dust*3 | ○ | — | — | ○ | — | ○ | — | ○ | — | — | — | — | — |
| | | | Coarser than 145 meshes | — | ○ | — | — | ○ | — | — | — | — | — | — | — | — |
| | | Granulated and fired | 20 meshes to dust*4 | — | — | — | — | ○ | — | — | — | — | — | — | — | — |
| | | | Coarser than 145 meshes | — | — | ○ | — | — | — | ○ | — | ○ | — | — | — | — |
| Flattening close test | | | | ○ | ○ | ◎ | ○ | ○ | ○ | ◎ | ◎ | ◎ | X | X | X | ○ |
| Breakage | | | | ○ | ◎ | ○ | ○ | ○ | ◎ | ◎ | ◎ | ◎ | X | X | X | ○ |
| Overall evaluation | | | | C | B | B | C | C | B | A | A | A | E | E | D | C |

*1 Packed with flux consisting of nickel powder only (80 meshes to dust)
*2 Unprocessed powder
*3 As granulated
*4 As granulated and fired Flattening close test:
◎ All of ten specimens are sound.
○ Of ten specimens, one or two have very minute defects, and the rest are sound. (The minute defects do not cause breakage in subsequent processes.)
△ Of ten specimens, one or two have small defects visible to the naked eye, and the rest are sound.
X Of ten specimens, two or more have cracks visible to the naked eye.

Breakage:
◎ No breakage
○ One to three breakages per 10 tons
X Four or more breakages per 10 tons Overall evaluation:
A Excellent
B Good
C Fair
D Poor
E Extremely poor
A to D: Acceptable
E: Rejected The granulated fluxes shown in Tables 3 and 4 were prepared by granulating the material powder by the pan amalgamation process. The binder was made up of one part of two moles of sodium silicate and three parts of three moles of potassium silicate. The fluxes were dried at 150° C. until moisture content dropped to 0.2 to 0.5%. The baked fluxes shown in Tables 3 and 4 were prepared by baking granulated fluxes at a temperature of 400° to 600°. The moisture content of the baked fluxes was not higher than 0.1%.

Using a constant-volume feeder, the flux was fed into the formed tube at a rate of 80 to 140 g/sec. The flux filling ratio was 10.0 to 15.0% by weight. The fringing edges of the opening were joined together by high-frequency induction welding. Welding was performed at a speed of 20 to 70 m/min., with a heat input (EpIp) of 100 to 250 kVA.

Tables 3 and 4 also show the results of a flattening close test conducted on the tubes thus prepared. The test was performed on ten specimens that were prepared by cutting tubes into successive lengths of 50 mm each and removing the flux therefrom. Each specimen was pressed from the direction 90 degrees apart from the weld until the inner walls thereof come in close contact with each other. Then, the weld was examined for cracks using a magnifying glass.

Then, the incidence of the breakage of wires drawn from the flux-cored tubes was investigated. The investigation was made on 10 tons of wires (having an outside diameter of 1.2 mm) drawn from flux-cored tubes with an outside diameter of 21.7 mm. The results are shown in Tables 3 and 4.

As is obvious from Tables 3 and 4, even fluxes consisting solely of granulated particles of practically nonmagnetic materials forming nonmetallic inclusions caused only such minute defects or breakage as were practically negligible. When the fluxes forming nonmetallic inclusion were granulated to particles coarser than 145 meshes, the results in the flattening close and wire breaking tests improved. Still better results were obtained when the granulated fluxes were fired.

The flux-cored seamless welding wires prepared by the method of this invention produced weld metals of satisfactory mechanical properties with satisfactory welding efficiency.

Embodiment III

A method described here manufactures a flux-cored tube by welding an unwelded tube so that fusion and joining the meeting edges thereof is carried out from the outside to the inside of the tube along a substantially straight welding line inclined at an angle of $\theta(10° < \theta < 90°)$ with respect to the axis of the tube. To achieve such fusion and joining, it is necessary to form a tube according to a predetermined forming schedule.

Figure 4:
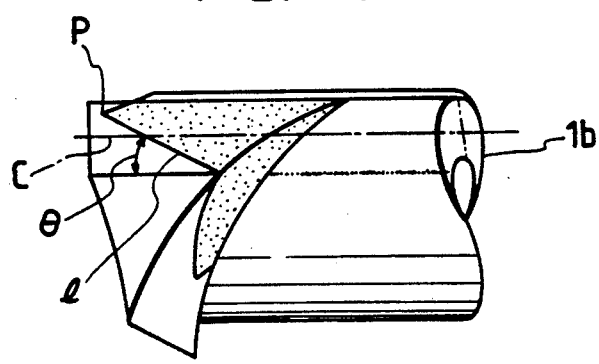
FIG. 4 schematically illustrates a welding finishing line.

FIG. 4 shows a welding finishing line 1. It is not absolutely essential that starting point P is located at the outer surface of the tube. Any subsurface point above the center line C of the wall thickness serves the purpose. When starting point P is located at such subsurface point, the upper profile of the inverted-V becomes smaller. The angle of inclination $\theta$ of the welding finishing line 1 decreases With an increase in the included angle of the inverted-V groove and a decrease in the apex angle. The groove becomes V-shaped when the angle of inclination $\theta$ becomes larger than 90 degrees.

When the angle of inclination becomes smaller than 10 degrees, cold cracking occurs on the inner side of the tube, thereby creating the risk of breaking in the course of drawing. When the angle of inclination becomes larger than 90 degrees, excess beads are formed on the inner side of the tube. This also creates the risk of breaking in the course of drawing. This is the reason why the angle of inclination is limited within the range of $10° < \theta < 90°$, or preferably within the range of $20° < \theta < 85°$.

Figure 5:
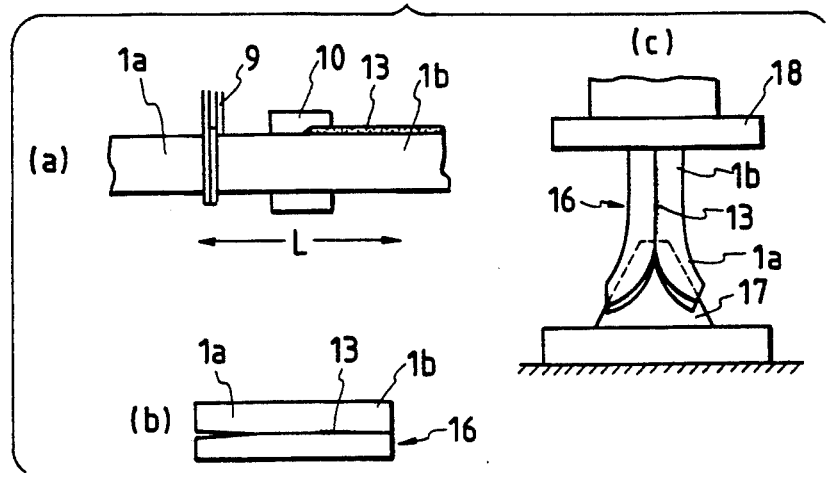
FIG. 5 shows the method of an expanding test.

The forming schedule to obtain a welding finishing line whose angle of inclination $\theta$ with respect to the axis of the tube is within the range of $10° < \theta < 90°$ and the heat input conditions complying with the angle of inclination are empirically determined in advance. The angle of inclination of the welding finishing line is determined by applying an expanding test on some welded tubes. Figs. 5(a), (b) and (c) illustrate the procedures of the expanding test. FIG. 5(a) shows squeeze rolls 10 in operation.

After discontinuing welding, an approximately 50 mm long specimen 16, which includes both of the unwelded portion 1a and the welded portion 1b, is cut off. As shown in FIG. 5(b), excess beads extend to halfway down on both of the outer and inner surfaces of the specimen 16, excluding the unwelded portion. Then, as shown in FIG. 5(c), the end of the unwelded portion of the specimen 16 is flared by pressed it (with a pressure of approximately 10 tons) over a conical tool 17 tapered at an angle of 60 degrees. Then, the angle of the welding finishing line visible on the fractured surface thus obtained is measured.

Figure 6:
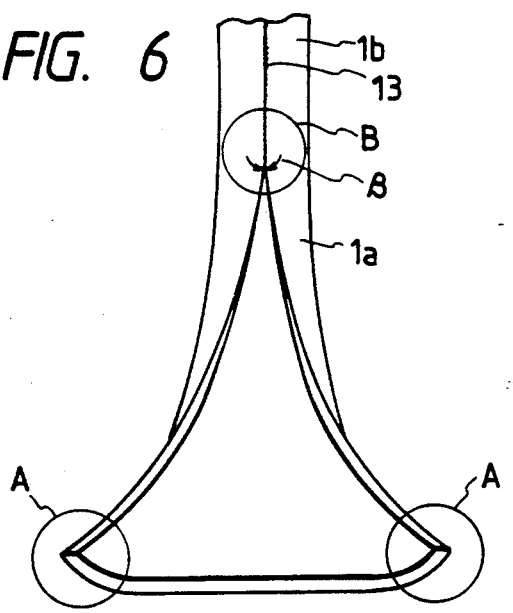
FIG. 6 schematically illustrates a process in which a metal strip is formed into a tubular shape.

Now the forming schedule will be described by reference to FIG. 6 that schematically illustrates the process in which a strip is formed into an unwelded tube.

In determining a forming schedule, the following variables are adjusted:

(a) the degree to which both edges A of the strip are bent by the preforming rolls;

(b) the degree of forming by the series of forming rolls;

(c) the degree to which the unwelded tube 1a is formed to provide the desired groove by the fins of the fin-pass rolls;

(d) the degree to which the unwelded tube 1a is formed to provide the desired groove by the fins of the seam-guide rolls; and (e) the degree of upsetting by controlling the diameter of the squeeze rolls and the gap therebetween.

Then, an inverted-V groove is formed in the unwelded tube 1a. The apex angle $\theta$ (the angle at which the unwelded tube opens at the welding point B) is then controlled so that the desired angle of inclination $\theta$ of the welding finishing line is obtained. While the angle $\alpha$ of the inverted-V groove is determined by mainly controlling the degree (c) described above, the apex angle $\beta$ is determined by controlling mainly the degree (e).

The following paragraphs describe a method of manufacturing flux-cored seamless welding wires using the apparatus shown in FIG. 1.

Figure 7:
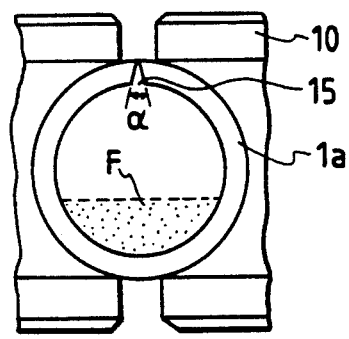
FIG. 7 is a front view showing squeeze rolls and an inverted-V groove.

FIG. 7 is an enlarged view showing the squeeze rolls 10 and the butted edges of the tube being welded. When the forming schedule is controlled so that the angle of inclination $\theta$ of the welding finishing line falls within the range of $10° < \theta < 90°$, the groove 15 is shaped like an inverted-V as illustrated. Though the groove angle $\alpha$ must be within a proper range, it is practically impossible or difficult to measure.

Flux-cored seamless welding wires were prepared as described in the following. By controlling the forming schedule so that the welding finishing line is inclined at different angles, strips of different thicknesses were formed into tubes having an outside diameter of 21.7 mm and an inside diameter of 17.3 mm. After filling the flux with a filling ratio of 12% ±1%, the unwelded tubes were continuously butt welded with a heat input of 140 kVA, at a frequency of 520 kHz and a welding speed of 30 m/min. The outside diameter of the welded tubes was reduced to 12.5 mm by the series of rolling rolls, and the obtained products were coiled up. After annealing, the diameter of the coiled tubes was further reduced to the desired product size.

Table 5 shows the results of drawing.

TABLE 5

| During Welding | Angle of Inclination θ Internal Bead | | 10° X | 20° ○ | 30–70° ○ | 80° ○ | 85° ○ | 110° X |
|---|---|---|---|---|---|---|---|---|
| During Drawing | Diameter of Broken Tube and Frequency of Breakage | 1.43 1.33 1.24 1.20 | 1 2 2 5 | 0 0 0 0 | 0 0 0 0 | 0 0 0 0 | 0 0 0 0 | 0 0 1 2 |

As is obvious from Table 5, breakage occurred during drawing when the angle inclination was not larger than 10 degrees because of cold cracking on the inner side of tubes. Breakage occurred also when the angle of inclination was 110 degrees because of excessive beads on the inner side of tubes. Neither internal cracking nor breakage during drawing occurred when the angle of inclination was kept within the range of 20 to 85 degrees.

Embodiment IV

As mentioned previously, welding according to this invention is carried out while controlling the expelling of spatters. But as the welding conditions, such as welding speed, power supply voltage and apex angle, vary, spatters exceeding the allowable limit may be expelled. To solve this problem, a method described here feeds the powdery and/or granular substance into the tube in such a manner as to leave a space at least up to the welding point. Then, with an opening near the welding point shielded from the side of the space thus left, a stream of gas is forcefully shot forth near the welding point to blow the expelled spatters outside the tube. The opening is shielded by putting a shielding member thereover from the side of the space. The shielding member, which is exposed to the welding heat, is made of ceramics or other similar refractory materials. The spatters are blown away by a stream of air, inert gas or other similar gases forcefully shot forth to the opening near the welding point.

The following paragraphs describe the manufacture of flux-cored seamless welding wires. In the description of this embodiment, units and parts similar to those of the apparatus shown in FIG. 1 are designated by similar reference characters, with no detailed description given thereabout.

Figure 8:
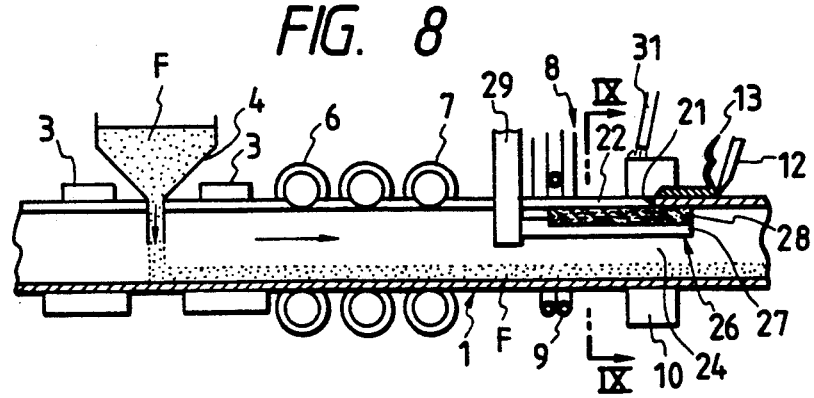
FIG. 8 shows the principal parts of an apparatus for manufacturing flux-cored seamless welding wires.
Figure 9:
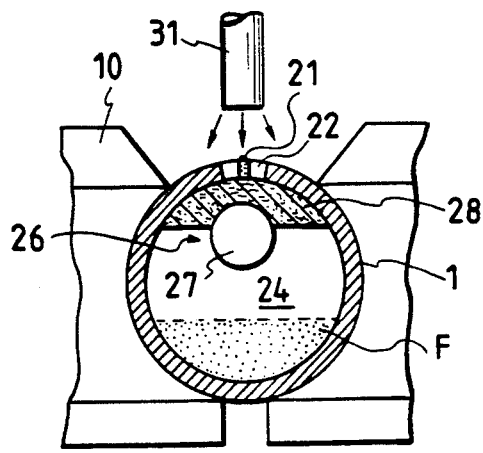
FIG. 9 is a cross-sectional view taken along the line IX—IX in FIG. 8.
Figure 10:
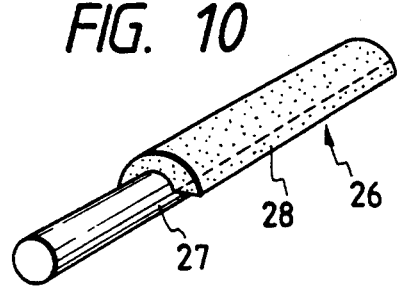
FIG. 10 is a perspective view of a shielding member provided in the apparatus shown in FIG. 8.

This embodiment is equipped with means to shoot forth a gas stream to the vicinity of the welding point, with the opening in that area shielded from the side of the space in the tube. As such, welding of the tube is performed while shooting forth the gas stream. As shown in FIGS. 8, 9 (a cross-sectional view taken along the line IX—IX in FIG. 8) and 10, the inside of a tube 1 is shielded by putting a shielding member 26 over an opening 22 near the welding point 21 from the side of a space 24 in the tube 1, thereby protecting the flux F. The shielding member 26 consists of a ceramics rod 27 and a sheet of ceramics fiber 28 attached thereto. Held by a support member 29 between a seam guide 7 and a work coil 9 and inserted in a space 24 in the tube 1, the rod 27 keeps the sheet of the ceramic fiber 28 in contact with the under side of the opening 22. The shielding member used in the embodiment being described has a length of 200 mm. A tilted gas shooting nozzle 31 provided above the welding point 21 shoots forth a stream of compressed air at 5 to 7 kgf/cm$^2$ to the opening 22. The shooting nozzle used in this embodiment has an outside diameter of 8 mm and an inside diameter of 4 mm.

The spatters expelled as a result of the welding of the tube 1 in the vicinity of the welding point 21 are blown out of the tube by the stream of air shot forth from the shooting nozzle 31. This avoids the mixing of the spatters with the flux F contained in the tube 1. The stream of air also blows off foreign matters away from the edges of the opening, thereby cleaning the edges before it reaches the welding point.

Figure 11:
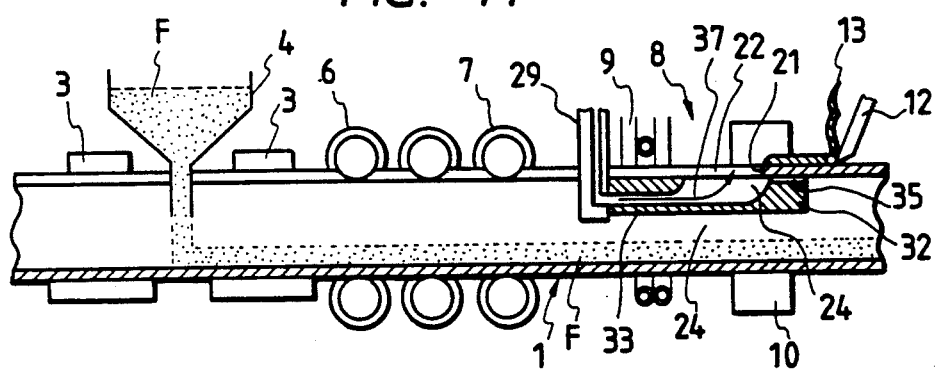
FIG. 11 shows the principal parts of another apparatus for manufacturing flux-cored welding wires.

FIG. 11 shows another embodiment of this invention, which differs from the embodiment shown in FIG. 8 in that a stream of gas is shot forth from below the opening. A shielding member 32 of ceramics having an air passage 33 and an air nozzle 34 supported by a support member 29 is inserted in the tube 1 as in the embodiment shown in FIG. 7, with the air nozzle 34 positioned to meet the opening 22 near the welding point 21. A stream of compressed from a compressor (not shown) is shot forth from the air nozzle 34 in the direction of an arrow 37. This stream of air blows the spatters resulting from welding outside, thereby avoiding the mixing of the spatters with the flux F in the tube 1. The shielding member used in this embodiment has a length of 200 mm, the air passage 33 has an inside diameter of 4 mm, and the air nozzle has a cross-sectional area of 30 mm by 8 mm.

Figure 12:
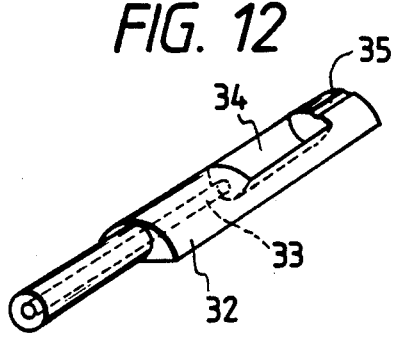
FIG. 12 is a perspective view of a shielding member provided in the apparatus shown in FIG. 11.

A shielding member 32 shown in FIG. 12 comprises a rod of ceramics having an air passage 33 and an air nozzle 34. The surface facing the opening is arcked with the same radius of curvature as the inside of the tube 1. Reference numeral 35 denotes a groove to protect the internal bead.

The following paragraphs describe the flux-cored welding wire manufactured by the apparatus just described.

Steel strip was formed into tubes having an outside diameter of 21.7 mm and an inside diameter of 17.3 mm. Flux was fed into the tubes being formed with a filling ratio of 12%. Table 6 shows the welding conditions employed. The welded tubes were coiled up after their outside diameter has been reduced to 12.5 mm through a series of size-reduction rolls. The tubes were then drawn through thirty-three dies with a final drawing speed of 1000 m/min. until the outside diameter reduced to 1.2 mm.

TABLE 6

| | | Welding Conditions | | Processed Weight (Kg) | Broken or Not Broken | Diameter of Broken Tube and Frequency of Breakage | | | |
|---|---|---|---|---|---|---|---|---|---|
| No. | Classification | Heat Input (kVA) | Welding Speed (m/min.) | | | 1.43 (mm) | 1.33 (mm) | 1.24 (mm) | 1.20 (mm) |
| 1 | Specimen for comparison | 80 | 12 | 580 | Broken | 0 | 1 | 0 | 0 |
| 2 | Specimen according to this invention (FIG. 8) | 80 | 10 | 720 | Not broken | 0 | 0 | 0 | 0 |

TABLE 6-continued

| No. | Classification | Welding Conditions | | Processed Weight (Kg) | Broken or Not Broken | Diameter of Broken Tube and Frequency of Breakage | | | |
| --- | --- | --- | --- | --- | --- | --- | --- | --- | --- |
| | | Heat Input (kVA) | Welding Speed (m/min.) | | | 1.43 (mm) | 1.33 (mm) | 1.24 (mm) | 1.20 (mm) |
| 3 | Specimen for comparison | 100 | 10 | 560 | Broken | 1 | 0 | 1 | 1 |
| 4 | Specimen according to this invention (FIG. 11) | 100 | 10 | 760 | Not broken | 0 | 0 | 0 | 0 |
| 5 | Specimen for comparison | 145 | 30 | 510 | Broken | 0 | 1 | 1 | 0 |
| 6 | Specimen according to this invention (FIG. 8) | 145 | 30 | 740 | Not broken | 0 | 0 | 0 | 0 |
| 7 | Specimen for comparison | 160 | 30 | 700 | Broken | 0 | 2 | 1 | 0 |
| 8 | Specimen according to this invention (FIG. 11) | 160 | 30 | 810 | Not broken | 0 | 0 | 0 | 0 |
| 9 | Specimen for comparison | 200 | 40 | 560 | Broken | 1 | 0 | 2 | 0 |
| 10 | Specimen according to this invention (FIG. 8) | 200 | 40 | 810 | Not broken | 0 | 0 | 0 | 0 |

Table 6 shows the results too. As is obvious from Table 6, tubes broke in the course of drawing when spatters were not blown off (Examples for Comparison Nos. 1, 3, 5, 7 and 9). This was due to the welding defects resulted from the mixing of spatters with the flux in the tube or the presence of impurities in the weld. By contrast, no breakage occurred during drawing when spatters were blown out of tubes.

Of Examples Nos. 2, 4, 6, 8 and 10 according to this invention, Examples Nos. 2, 6 and 10 were according to the embodiment shown in FIG. 8 and Examples Nos. 4 and 8 were according to the embodiment in FIG. 11.

Figure 13:
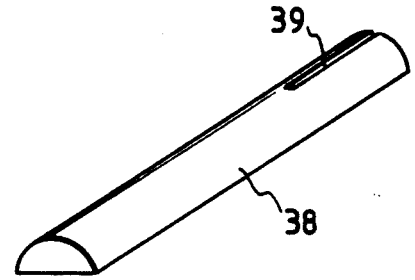
FIG. 13 is a perspective view showing another example of a shielding member.

FIG. 13 shows another example of a shielding member. A shielding member 38 comprises a rod of ceramics having a cross section arced with the same radius of curvature as that of the inside of the tube 1 to assure complete shielding, with a groove 39 to protect the internal bead provided at the top.

The stream of gas used in this embodiment blows the spatters expelled as a result of welding outside the tube. Therefore, the spatters do not mix with the powdery and/or granular substance in the tube. Even when such substance containing ferromagnetic ingredients is blown up by the action of a magnetic field induced by a high-frequency current, it does not adhere to the fringing edges of the opening that is shielded. As a consequence, no welding defect and, therefore, no breakage in the drawing process occurs.

Embodiment V

Like the embodiment IV, this embodiment is also intended to prevent spatters in excess of the allowable limit from mixing with the powdery and/or granular substance in the tube. To achieve this object, the powdery and/or granular substance is fed into the tube while leaving a space along the tube at least up to the welding point. Then, the spatters are drawn from near the welding point through a suction tube that extends through the space along the tube and discharged outside the tube upstream of the welding point.

A vacuum pump is used for the suction of the spatters. The spatters are sucked either in an area covering the upstream and downstream of the welding point, an area upstream of the welding point, an area downstream of the welding point, or at one specific point in these areas.

An apparatus for manufacturing tubes filled with a powdery and/or granular substance used in this embodiment comprises a unit that forms a metal strip fed in the longitudinal direction thereof into a tubular shape, a unit to feed the powdery and/or granular substance into the formed tube while leaving a space along the tube at least up to the welding point, and a welding unit that joins together the fringing edges of an opening that extends in the longitudinal direction of the tube. The apparatus also has a suction tube that extends through the space along the tube and, with an intake thereof positioned near the welding point, and a suction pump connected to the suction tube.

The welding unit is selected from the high-frequency induction, high-frequency resistance or other types. The outside diameter of the suction tube is equal to approximately 30 to 90% of the space in the tube in which the powdery and/or granular substance is fed. Exposed to the welding heat, the leading end of the suction tube where the intake is provided should preferably be made of such heat-resisting materials as alumina, silicon carbide and silicon nitride. The leading end of the suction tube may be a designed as a replaceable tip. The suction pump is selected from the positive-displacement, centrifugal, ejector or other types of vacuum pumps. The intake of the suction tube may be opened toward the vicinity of the welding point. An intake opening toward the vicinity of the welding point is formed by cutting off an approximately semicircular portion of the leading end of the suction tube (positioned near the welding point) in the longitudinal direction thereof.

The following paragraphs describe the manufacture of flux-cored seamless welding wires.

Figure 14:
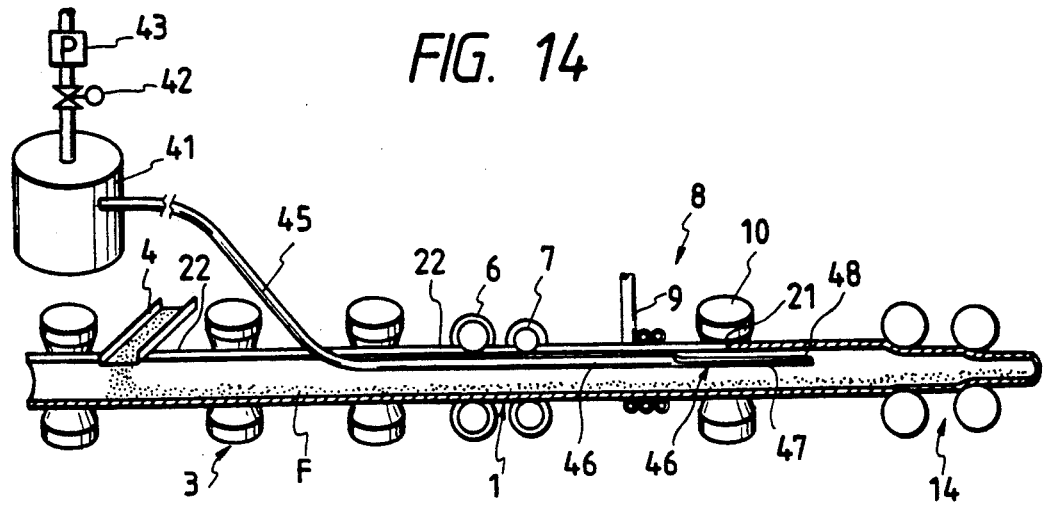
FIG. 14 shows the principal parts of still another apparatus for manufacturing flux-cored seamless welding wires.

A wire drawing line shown in FIG. 14 has a collecting tank 41 whose top is connected to a centrifugal vacuum pump 43 through a solenoid valve 42. The suction force expressed in terms of the vacuum in the collecting tank is, for example, between 1000 and 1600 mmAq. A suction steel 45 of steel is attached to the cylindrical portion of the collecting tank 41. The suction tube 45 enters the tube 1 being formed from an opening 22 therein and extends in the traveling direction of the tube 1 to near a seam guide 7. The suction tube 45 used in this embodiment has an outside diameter of 10 mm and an inside diameter of 6 mm. An intake tip 46 of alumina is attached to the leading end of the suction tube 45. A semicircular spatter intake 48 is provided near the leading end of the cylindrical tip proper 48. The suction tip 46 used in this embodiment has an outside diameter of 10 mm and an inside diameter of 6 mm, with the intake 48 thereof having a length of 100 mm.

When the tube 1 is welded, spatters are expelled in the vicinity of the welding point 21. By the action of the vacuum pump 43, the spatters are sucked into the intake 48 of the suction tip 46 and collected into the collecting tank 41 through the suction tube 45. Therefore, the spatters do not mix with the flux in the tube 1.

The following paragraphs describe the manufacture of flux-cored welding wires by the apparatus just described.

Steel strip was formed into tubes having an outside diameter of 25.4 mm and an inside diameter of 21.4 mm. Flux was fed into the tubes being formed with a packing ratio of 12%, and the flux-cored tubes were welded under the conditions shown in Table 7.

falling from the welding area are caught by the spatter catching wings 54, guided to the intake 53 along the surface of the wings, and sucked by the suction tube 45. Covering the clearance between the inner wall of the tube and the tip proper 52, the spatter catching wings 54 serve as a spatter shield. This prevents the spatters from falling and mixing with the flux F at the bottom of the tube.

Another example of an apparatus for manufacturing flux-cored seamless welding wires is described in the following.

Figure 17:
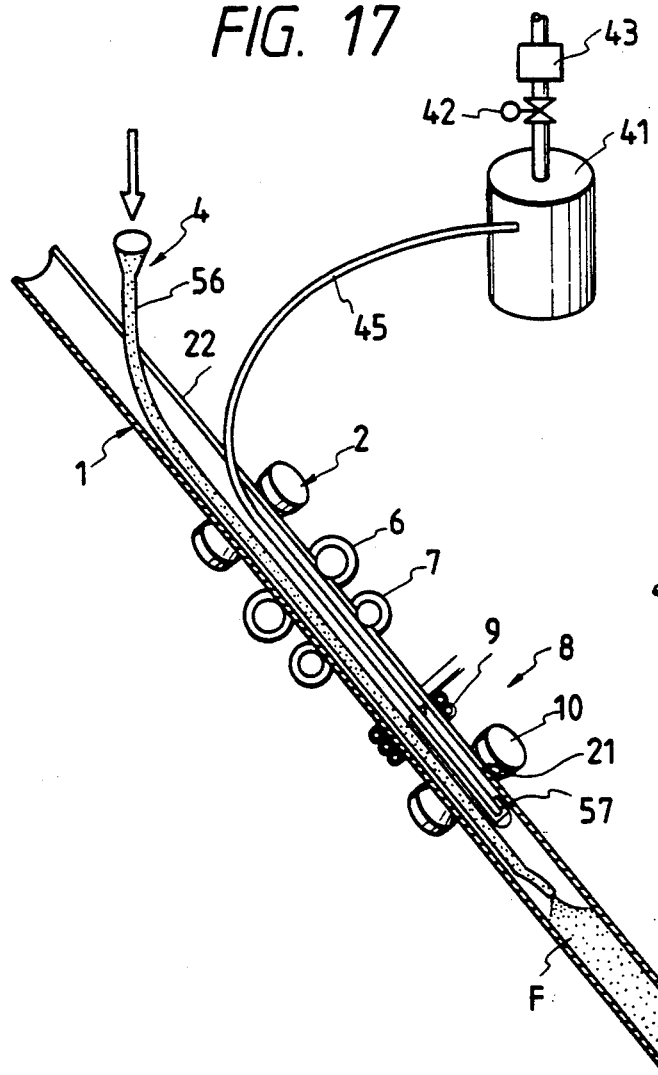
FIG. 17 shows the principal parts of yet another apparatus for manufacturing flux-cored welding wires.

A wire drawing line shown in FIG. 17 slopes forward at an angle greater than the angle of repose of the flux (60 degrees in this embodiment). A series of forming rolls, a seam guide 7 and a high-frequency induction welding machine 8 are disposed in that order along the sloping wire drawing line. A flux feeder 4 has a flux feed tube 56 of quartz which is inserted in a tube 1 being formed through an opening 22 therein from between the forming rolls. The leading end of the flux feed tube 56 is positioned downstream of the welding point 21. The suction tube 45 enters the tube downstream of the point

TABLE 7

| | | Welding Conditions | | Processed | Broken | Diameter of Broken Tube and Frequency of Breakage | | | |
|---|---|---|---|---|---|---|---|---|---|
| No. | Classification | Heat Input (kVA) | Welding Speed (m/min.) | Weight (Kg) | or Not Broken | 1.43 (mm) | 1.33 (mm) | 1.24 (mm) | 1.2 (mm) |
| 1 | Specimen for comparison | 80 | 12 | 576 | Broken | 1 | 1 | 2 | 2 |
| 2 | Specimen according to this invention | 80 | 12 | 722 | Not broken | 0 | 0 | 0 | 0 |
| 3 | Specimen for comparison | 100 | 12 | 521 | Broken | 1 | 1 | 1 | 2 |
| 4 | Specimen according to this invention | 100 | 12 | 738 | Not broken | 0 | 0 | 0 | 0 |
| 5 | Specimen for comparison | 145 | 32 | 472 | Broken | 0 | 1 | 1 | 1 |
| 6 | Specimen according to this invention | 145 | 32 | 798 | Not broken | 0 | 0 | 0 | 0 |
| 7 | Specimen for comparison | 160 | 32 | 712 | Broken | 1 | 0 | 0 | 1 |
| 8 | Specimen according to this invention | 160 | 32 | 793 | Not broken | 0 | 0 | 0 | 0 |
| 9 | Specimen for comparison | 200 | 42 | 552 | Broken | 0 | 1 | 0 | 1 |
| 10 | Specimen according to this invention | 200 | 42 | 735 | Not broken | 0 | 0 | 0 | 0 |

Spatters were sucked from the vicinity of the welding point under a vacuum of 1200 to 1400 mmAq (in the collecting tank) at a rate of 30 to 50 m/min. The welded tubes were coiled up after their outside diameter has been reduced to 11.5 mm through a series of size-reduction rolls. The tubes were then drawn through thirty-three dies with a final drawing speed of 1000 m/min. until the outside diameter reduced to 1.2 mm.

Table 7 shows the results of drawing. As is obvious from Table 7, breakage occurred during drawing when spatters were not sucked and collected (Examples for Comparison Nos. 1, 3, 5, 7 and 9). This was due to the mixing of spatters with the flux in the tube. By contrast, no breakage occurred during drawing when spatters were sucked and collected.

Figure 15:
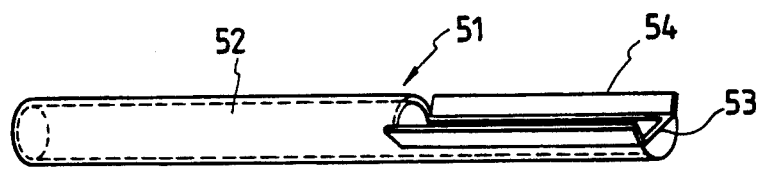
FIG. 15 is a perspective view showing another example of a suction tip.
Figure 16:
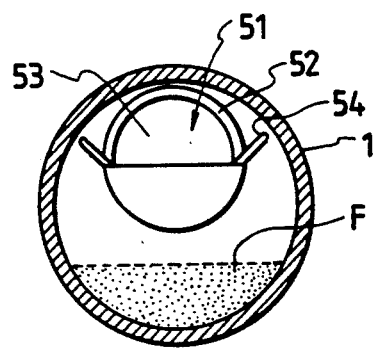
FIG. 16 is a front view showing the suction tip of FIG. 15 that is inserted in a tube being manufactured.
Figure 18:
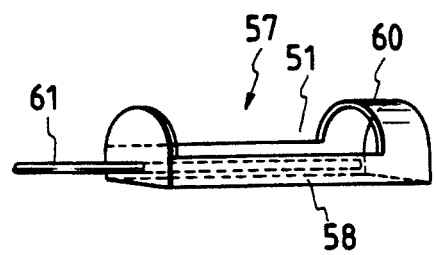
FIG. 18 is an enlarged perspective view showing a suction tip provided in the apparatus of FIG. 17.

FIGS. 15 and 16 show another example of a suction tip. A suction tip 51 shown in FIG. 15 essentially comprises a tubular member 52 similar to the one shown in FIG. 14. As shown in FIG. 16, spatter catching wings 54 are provided on both edges of the intake 53. The spatter catching wings 54 are tilted toward the spatter intake 54 and cover the clearances between the inner wall of the tube and the tip proper 52. The spatters where the flux feed tube 56 is inserted into the tube and extends to near the seam guide 7 in the direction in which the tube 1 travels forward. An intake tip 57 of alumina is attached to the leading end of the suction tube 45. As shown in FIG. 18, the intake tip 57 comprises a semicircular box-shaped tip proper 58. A spatter intake 59 opening upward is provided in the tip proper 58, with a connecting tube 61 fastened to near the bottom thereof. While one end of the connecting tube 61 extends to near a spatter receiver 60 at the leading end of the tip proper, the other end is connected to the leading end of the suction tube 45.

Provision may be made to feed a pressurized gas (such as argon, helium, nitrogen gas, carbon dioxide gas and air) into the flux feed tube 56 to facilitate the flow of the flux F therethrough.

In the embodiment shown in FIG. 17, flux may be directly fed from a flux feeder into a tube being formed through an opening therein, as in the embodiment of FIG. 14, without employing the flux feed tube. Then, the flux moves forward in the tube while sliding over the bottom surface of the tube.

In this embodiment, spatters resulting from welding are drawn into the tube together with the sucked air and discharged outside upstream. Therefore, the spatters do not mix with the powdery and/or granular substance in the tube. This eliminates the breaking of tubes filled with the powdery and/or granular substance in the drawing process, with a resulting improvement in the working efficiency and product yield in the manufacture of such tubes.

Embodiment VI

In the manufacture of tubes filled with a powdery and/or granular substance, the edges of the opening therein are stained by, for example, the dust (of the powdery and/or granular substance) raised when flux is fed for edge welding, the metal powder resulting from the abrasion of the forming rolls and the strip in the forming process, and the lubricating oil that is likely to catch such dust and powder. When the edges of the opening are welded without removing these accretions, they are entrapped in the weld to form welding defects. Tubes involving such welding defects often break in the subsequent drawing process, thereby lowering the working efficiency and product yield therein. The possibility of breaking increases with an increase in the degree of drawing.

An embodiment to be described in the following provides a method and apparatus for manufacturing tubes filled with a powdery and/or granular substance having satisfactory welds by performing welding after removing such stains from the edges of the unwelded opening therein.

In this embodiment, accretions on the fringing edges of the unwelded opening in a formed tube are wiped off just ahead of the welding point with a fabric belt. More specifically, accretions on the fringing edges are wiped off just ahead of or upstream of the welding point before they begin to melt.

An apparatus for manufacturing tubes filled with a powdery and/or granular substance used in this embodiment comprises a unit that forms a metal strip fed in the longitudinal direction thereof into a tubular shape, a unit to feed the powdery and/or granular substance into the formed tube while leaving a space along the tube at least up to the welding point, and a welding unit that joins together the fringing edges of an opening that extends in the longitudinal direction of the tube. The apparatus also has a push roll to push a fabric belt into the opening just ahead of the welding point and bring it in contact with the fringing edges of the opening and a device that feeds the fabric belt to and take it back from the push-in roll. The welding unit is selected from the high-frequency induction and high-frequency resistance types. The fabric belt pushed into the small opening (approximately 2.0 to 4.0 mm in width) by the push-in roll comes in contact with the fringing edges thereof to wipe off stains therefrom. Because the gap between the fringing edges changes delicately under the influence of the springback of the metal strip, it is preferable that the fabric belt has such cushioning property as will always keep it in contact with the edges no matter how the gap changes. Considering the exposure to the welding heat near the welding point, the fabric belt should preferably be made of a heat-resisting material. The fabric belt is made of plant fiber, such as cotton, synthetic fiber or ceramics fiber.

Figure 19:
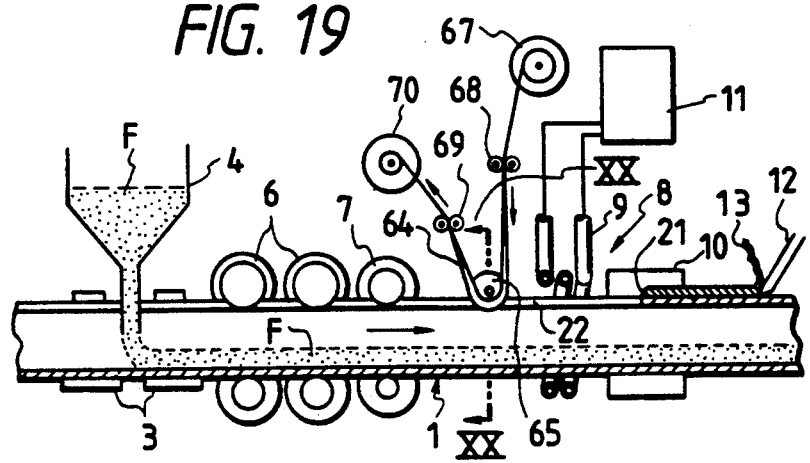
FIG. 19 shows the principal parts of another apparatus for manufacturing flux-cored welding wires.

FIG. 19 shows the principal parts of an apparatus for manufacturing flux-cored seamless welding wires.

Figure 20:
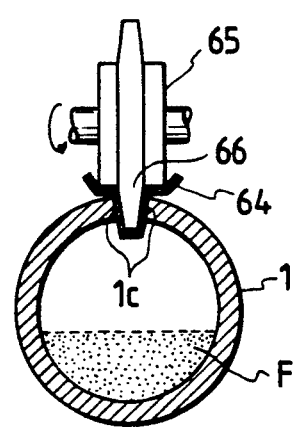
FIG. 20 is a cross-sectional view taken along the line XX—XX in FIG. 19.

As shown in FIGS. 19 and 20 (a cross-sectional view taken along the line XX—XX in FIG. 19.), a push-in roll 65 pushes in a fabric belt 64 into an opening 22 just ahead of the welding point 21 between a seam guide 7 and a work coil 9 to wipe off the stains from the fringing edges 1c of the opening 22. The push-in belt 65 has a fin 66 that is adapted to push in the fabric belt into the opening 22 as the roll 65 rotates. The device to feed the fabric belt 64 to and take it back from the push-in roll 65 in this embodiment is made up of a supply system comprising a feed bobbin 67 to feed the fabric belt 64 to the push-in roll 65 and a pair of entry-side guide rolls 68 disposed between the feed bobbin 67 and the push-in roll 65 and a take-back system comprising a take-up bobbin 70 to take back the stained fabric belt from the push-in roll 65 and a pair of exit-side guide rolls 69 disposed between the take-up bobbin 70 and the push-in roll 65. While the take-up bobbin 70 is a driving bobbin, the push-in roll 65 and feed bobbin 67 are driven. The fabric belt 64 is guided by the entryside guide rolls 68 and the exit-side guide rolls 69 so as not to sag therebetween. As the take-up bobbin 70 rotates, the fabric belt 64 enters the opening 22 from the downstream side (the work coil side) of the push-in roll and leaves the opening on the upstream side (the seam guide side). The running speed of the fabric belt 64 can be freely controlled by adjusting the rotating speed of the take-up bobbin 70. The running speed of the fabric belt 64 need not be greater than about 1 to 50 cm/min. Because the belt moves in the opposite direction of the travel of the tube 1 that is fed at a high speed of about 10 to 50 m/min. The fabric belt supplied at a speed in the above range wipes off the stains well from the edges 1c.

With the dust generated in the feeding process of the flux F and the abrasive powder resulting from the strip forming process thus removed by the fabric belt 22, the edges 1c of the opening 22 entering the welding point 21 is always kept clean.

Now the manufacture of flux-cored welding wires by the apparatus just described will be described.

Steel strip was formed into tubes having an outside diameter of 21.7 mm and an inside diameter of 17.3 mm. Flux was filled into a tube being formed With a filling ratio of 12%. The tubes filled with the flux were welded under the conditions shown in Table 8. Stains were removed from the edges 1c of the opening 22 by a 1 mm thick and 20 mm wide cotton belt 64 disposed just ahead of the welding point 21 between the work coil 9 and seam guide 7 and running at a speed of 10 cm/min. in the opposite direction of the travel of the tube 1. The welded tubes were coiled up after their outside diameter has been reduced to 12.5 mm by a series of size-reduction rolls. The flux-cored tubes were then drawn into wires having an outside diameter of 1.2 mm with a final drawing speed of 1000 m/min.

Table 8 shows the results of drawing.

TABLE 8

| No. | Welding Conditions (at 520 kHz) | | | | Edges Wiped or Not | Ratio of Weld Cracking (21.7 mm diameter) | Diameter of Broken Tube and Frequency of Breakage (Per Ton of Processed Tubes) | | | | Remarks |
|---|---|---|---|---|---|---|---|---|---|---|---|
| | Welding speed (m/min.) | Voltage (kV) | Amperage (A) | Heat Input (kVA) | | | 1.43 mm | 1.33 mm | 1.24 mm | 1.20 mm | |
| 1 | 15 | 9.4 | 9.3 | 87.4 | Wiped | 0 | 0 | 0 | 0 | 0 | Specimen according to this invention |
| 2 | | | | | Not wiped | 2 | 0 | 0 | 0 | 1 | Specimen for comparison |
| 3 | 25 | 10.9 | 10.9 | 118.8 | Wiped | 0 | 0 | 0 | 0 | 0 | Specimen according to this invention |
| 4 | | | | | Not wiped | 5.0 | 0 | 0 | 1 | 5 | Specimen for comparison |
| 5 | 30 | 11.6 | 11.5 | 133.4 | Wiped | 0 | 0 | 0 | 0 | 0 | Specimen according to this invention |
| 6 | | | | | Not wiped | 8.5 | 1 | 2 | 5 | 10 | Specimen for comparison |
| 7 | 35 | 12.4 | 12.3 | 152.5 | Wiped | 0 | 0 | 0 | 0 | 0 | Specimen according to this invention |
| 8 | | | | | Not wiped | 20.3 | 1 | 3 | 8 | 19 | Specimen for comparison |

Figure 21A:
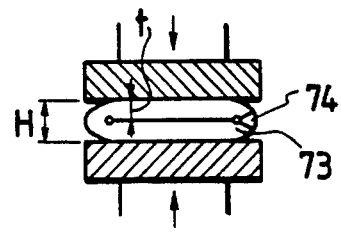
FIG. 21(a) illustrates the method Of a flattening close test.
Figure 21B:
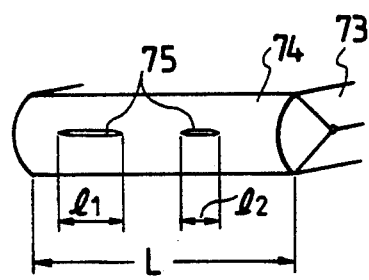
FIG. 21(b) shows how the incidence of cracking in the specimen tested by the test of FIG. 21(a).

The cracking ratio (%) of welding defects is determined by applying a flattening close test (flattened thickness H=2t (t=wall thickness of the tube)) on a specimen (having an outside diameter of 21.7 mm, an inside diameter of 17.3 mm and a length L of 50 mm) taken from a tube right after welding as shown in FIG. 21(a). The cracking ratio (%) is a ratio of the total length $\Sigma l$ ($=l_1+l_2$) of cracks 75 occurred in the weld 74 of the specimen 73 shown in FIG. 21(b) to the length L of the specimen, which is expressed as $\Sigma l/L \times 100$.

As is obvious from Table 9, the frequency of breakage during the wire-drawing process increased with increasing welding speed when the accretions were not removed from the fringing edges of the opening (as in Examples for Comparison Nos. 2, 4, 6 and 8). It became difficult to perform the drawing operation when the welding speed exceeded 30 m/min. This is because the quantity of dust generated in feeding the flux increases with increasing welding speed. Also the increasing heat input builds up a stronger induction field. These factors attract more dust to the edges of the opening. As the quantity of dust and other accretions entrapped in the weld increases, more welding defects tend to occur. When accretions were removed from the edges of the opening (as in Examples Nos. 1, 3, 5 and 7 according to this invention), no welding defect and no breakage during drawing occurred.

No welding defect occurred in this embodiment as accretions, such as the dust generated in feeding the flux and the abrasive powder resulting form the strip forming process, were wiped off from the fringing edges of the opening in the formed tubes. This resulted in the elimination of breakage in the subsequent wire-drawing process and an improvement in the working efficiency and product yield in the preparation of tubes filled with a powdery and/or granular substance.

Embodiment VII

The tubes passing the work coil in the manufacture of tubes filled with a powdery and/or granular substance described above carry such magnetic powders as the iron particles contained in the dust generated in feeding the flux and the abrasive powder and chips generated in the strip forming process. When a tube carrying such magnetic powders passes the work coil, a magnetic field created by the high-frequency current passing through the work coil transfers the magnetic powders from the tube to the work coil. When the magnetic powders thus accumulated on the work coil exceeds a certain limit, electricity is discharged between the tube and work coil. This electric discharge damages the water-cooled copper pipe on the work coil, with the cooling water contained therein scattered thereabout. When this damage occurs, the operation of the apparatus must be temporarily discontinued to change the work coil and remove the unwelded tube in process. This shutdown has heavily impaired the utilization rate of the apparatus and product yield.

The embodiment to be described hereunder provides a method and apparatus for manufacturing tubes filled with a powdery and/or granular substance that greatly lengthens the life of the work coil by preventing the adhesion of magnetic powders thereto, thereby avoiding the electric discharge by the built-up magnetic powders and preventing the damage to the work coil caused thereby.

This method feeds a metal strip in the longitudinal direction thereof, forms the strip into a tubular shape, feeds a powdery and/or granular substance into a tube formed from the strip while leaving a space along the tube at least up to the welding point, and join together the fringing edges of an opening extending in the longitudinal direction of the tube by high-frequency induction welding that is applied by use of an induction heating coil that surrounds the tube with a space left therebetween. A stream of gas is passed through the space between the induction heating coil and tube to remove the magnetic powder therefrom.

The removal of the magnetic powder is achieved by shooting forth a stream of such gases as air or inert gas into that space or by sucking the air therefrom.

The ejection or suction should preferably be performed at such point, in such direction and with such force as will exert no influence on the flux contained in the tube.

An apparatus for manufacturing tubes filled with a powdery and/or granular substance used in this embodiment comprises a unit that forms a metal strip fed in the longitudinal direction thereof into a tubular shape, a unit to feed the powdery and/or granular substance into the formed tube while leaving a space along the tube at least up to the welding point, and a high-frequency induction welding unit that has an induction heating coil surrounding the tube with a space left therebetween to joins together the fringing edges of an opening that extends in the longitudinal direction thereof.

The apparatus also has an insulating shielding member that covers the space between the induction heating coil and tube and a unit to pass a gas stream through the space between the shielding member and tube. Because the induction heating coil is exposed to the welding heat, the insulating shielding member should preferably be made of such heat-resisting materials as quartz glass, ceramics, alumina or fabrics of asbestos, ceramics and glass. The gas stream is either blown out or sucked in. The gas blow-out unit has a compressor and a blow-out tube. A compressed stream of air, inert gas or other gases is blown out into said space from the compressor through the blow-out tube. The gas suction unit has a suction pump and a suction tube. The suction pump draws the air from said space through the suction tube to create a stream of air therein. The suction pump is selected from the positive-displacement, centrifugal, ejector or other types of vacuum pumps. With their tip exposed to the welding heat, the blow-out and suction tubes should preferably be made of such heat-resisting materials as alumina, silicon carbide and silicon nitride.

Figure 22:
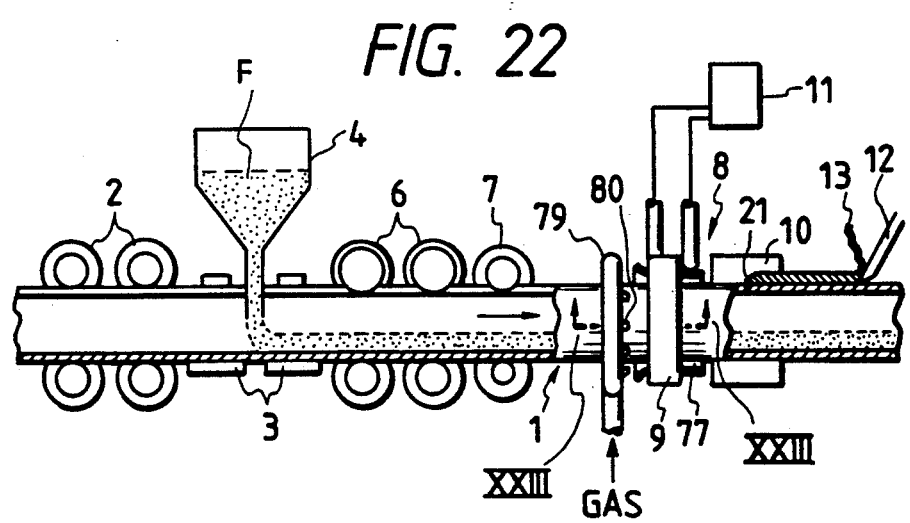
FIG. 22 shows the principal parts of another apparatus for manufacturing flux-cored welding wires.
Figure 23:
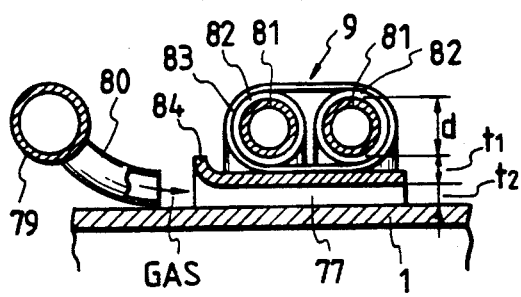
FIG. 23 is a cross-sectional view taken along the line XXIII—XXIII in FIG. 22.

FIG. 22 shows the principal parts of an apparatus for manufacturing flux-cored welding wires. This apparatus has a unit to remove magnetic powder by a gas stream passed through a space 77 between the work coil 9 and tube 1 shown in FIG. 1. Thus, no magnetic powder is allowed to accumulate on the work coil 9 because the magnetic powder that has collected on the work coil 9 or that is about to be transferred from the tube to the work coil 9 is removed by means of a gas stream that either blows out or sucks in such magnetic powder from the space 77. As shown in FIGS. 22 and 23 (a cross-sectional view taken along the line XXIII—XXIII in FIG. 22.), an ejection tube 79 connected to an air compressor (not shown) is provided just ahead of the work coil 9. The ejection tube 79 used in this embodiment is shaped like a ring concentric with the work coil 9. A gas ejection nozzle 80 extended therefrom is directed toward the space 77.

As shown in FIG. 23, a water-cooled copper tube 81 of the work coil 9 is wound around the tube 1 twice, with both ends thereof connected to a high-frequency power supply 11. The water-cooled copper tube 81 is protected by a primary coating 82 of a heat-resisting material, such as a coating of glass fiber used in this embodiment, and an overall secondary coating of glass fiber. On the inner side of the work coil 9 is provided a concentric insulating shielding member, such as a shielding tube 84 of ceramics used in this embodiment, with a space 77 left between the shielding member and the tube 1. One end of the shielding tube 84 closer to the ejection tube 79 is flared to facilitate the admission of the air blown out from the gas ejection nozzle 80 into the space 77.

The compressed air blown out from the gas ejection nozzle (in the direction of an arrow) removes the magnetic powder from the shielding tube through the space 77, thereby preventing the buildup of the magnetic powder.

Flux-cored welding wires are manufactured as described hereunder. A steel strip approximately 50 to 100 mm wide and 1.5 to 2.5 mm thick is formed into an unwelded tube having an outside diameter of about 16 to 33 mm. The water-cooled copper tube of the work coil has an outside diameter of about 4 to 8 mm, and about 80 to 300 kVA of heat (EpIp) is supplied through the copper tube.

If the outside diameter of the water-cooled copper tube 81 is d, the gap (i.e., the coating thickness) between the outer surface of the water-cooled copper tube 81 and the inner surface of the shielding tube 84 is $t_1$, and the gap (i.e., the space 77) between the inner surface of the shielding tube 84 and the outer surface of the tube 1 is $t_2$, it is preferable to make $t_1 \geq 0.2d$ to reduce the adhesion of the magnetic powder to the work coil, $t_1 + t_2 \leq d$ to increase the efficiency of the work coil, and $t_2 \geq 1$ mm to facilitate the removal of the magnetic powder from the space 77.

Figure 24:
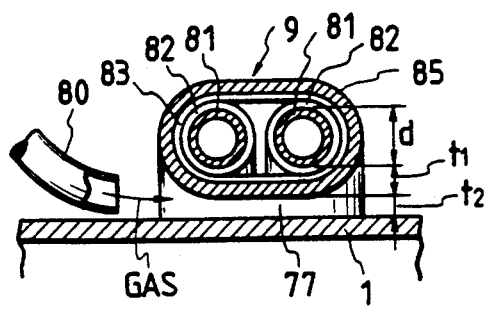
FIG. 24 is a cross-sectional view showing another example of a work coil in an apparatus for manufacturing flux-cored welding wires.

The embodiment shown in FIG. 24 is similar to the one shown in FIG. 23 in that the water-cooled copper tube is protected by a primary coating 82 and a secondary coating 83 of glass fibers and a gas ejection nozzle 80 is provided, and different in that the entire work coil 9 is covered with a shielding coating 85 of ceramics instead of the shielding tube 84 shown in FIG. 23. In this case, the thickness of the coating $t_1$ is equal to the clearance between the outer surface of the water-cooled copper tube 81 and the surface of the shielding coating 85.

As in the embodiment shown in FIG. 23, the gas ejection nozzle shoot forth the air from a compressor not shown in the direction indicated by the arrow. The ejected compressed air immediately removes the magnetic powder from the shielding coating 85 through the space 77, thereby preventing the buildup of the magnetic powder.

In stead of shooting forth the gas into the space 77 from the gas ejection nozzle used in the embodiments shown in FIGS. 23 and 24, air may be sucked from the space 77 using a suction tube which draws the magnetic powder from the space 77 together with air into a collecting tank. It is preferably to make the surface of the shielding members such as the shielding tube 84 and shielding coating 85 as smooth as possible to minimize the adhesion of the magnetic powder and facilitate the removable of the adhered powder.

The following paragraphs describe the manufacture of flux-cored welding wires using the apparatus shown in FIGS. 22 and 23.

Steel strip (according to JIS G 3131, SPHC) having a width of 62.9 mm and a thickness of 2.2 mm was formed into tubes with an outside diameter of 21.7 mm and an inside diameter of 17.3 mm, with the fringing edges of the opening therein joined together by high-frequency induction welding. Flux was fed into the tubes being formed with a filling ratio of 12%. The welded tubes were coiled up after their outside diameter has been reduced to 12.5 mm through a series of size-reduction rolls. The tubes were then drawn through thirty-three dies with a final drawing speed of 1000 m/min. until the outside diameter reduced to 1.2 mm.

Welding was performed with a heat input of $EpIp = 12.4$ (kV) $\times 11.8$ (A) $= 146.3$ kVA and a welding speed (tube travel speed) of 30 m/min. With the embodiment of FIG. 23, in which the diameter d of the water-cooled copper tube is 5 mm and the gap $t_1 + t_2$ between the water-cooled copper tube and the tube is 4 mm, the service life of the work coil was investigated by changing the thickness $t_1$ of the coating as shown in Table 9. The results of the investigation are shown in Table 9.

TABLE 9

| No. | | 1 | 2 | 3 | 4 | 5 | 6 |
|---|---|---|---|---|---|---|---|
| Coating Thickness $t_1$ (mm) | | 0.5 | 1.0 | 1.5 | 2 | 2.5 | 3 |
| ($t_1/d$) | | (0.1) | (0.2) | (0.3) | (0.4) | (0.5) | (0.6) |
| Space $t_2$ (mm) | | 3.5 | 3.0 | 2.5 | 2.0 | 1.5 | 1.0 |
| Life of Work Coil | Embodiment in FIG. 23 | — | — | ○ | ○ | ○ | ○ |
| | Embodiment in FIG. 24 | — | ○ | ○ | ○ | ○ | ○ |
| | Example for Comparison | X | X | X | X | — | — |

Note.
○: Good (100 hours or above)
X: Poor (10 hours or under)
Example for comparison:
Prepared without gas stream, shielding tube 84 and shielding coating 85 and with only secondary coating 83.

As is obvious from Table 9, magnetic powder adhered to the work coil and built up, with electric discharge started in such a short time as between 1 and 10 hours and the water-cooled copper tube of the work coil broken, when no gas was passed through the space between the work coil and the tube and a coating of glass fiber alone was applied. With the embodiments of FIGS. 23 and 24 in which a stream of gas was passed, by contrast, magnetic powder was removed from the space between the work coil and the tube by the gas stream, whereby no build-up of the magnetic powder and electric discharge occurred. As a consequence, no change appeared on the work coil during the testing period of about 100 hours.

The gas stream passed through the space between the work coil and the tube in the embodiments just described prevents the magnetic powder from adhering to the work coil. Even when some powder adheres, the gas stream blows such powder out of the space. Therefore, no accumulation of magnetic powder occurs. As a consequence, no electric discharge, which can occur when the magnetic powder is present between the work coil and the tube, occurs. With the electric-discharge-induced damage to the work coil thus prevented, the working efficiency and product yield in the manufacture of tubes filled with a powdery and/or granular substance are improved.

Embodiment VIII

Flux-cored wires for gas-shielded arc welding (hereinafter called flux-cored wires) are made up of such outer skins as strip of mild or low-alloy steel and fluxes comprising slag forming agents, deoxidizers, alloying agents, arc stabilizers and other materials contained therein. Flux-cored wires produce more stable arcs and expel less spatters than solid wires. They assure easier welding, producing satisfactory beads in flat, horizontal, vertical and other positions. Flux-cored wires also provide higher melting and fusion speeds. Against the background of increasing demands for higher welding efficiency, the use of flux-cored wires is increasing sharply because of the features described above. Particularly, flux-cored wires whose flux contains not less than 4% (total weight of the wire=100%) of such slag forming agents as $TiO_2$ and $SiO_2$ are extensively used because they provide good weldability in the various welding positions mentioned before.

New methods of manufacturing flux-cored wires disclosed in the Japanese Provisional Patent Publications Nos. 234794 of 1985 and 234795 of 1985, etc. are attracting attention. These new methods continuously manufacture flux-cored wires by continuously feeding steel strip of relatively large size, feeding flux into unwelded tubes being formed from the strip, butt welding the upper edges of the formed tubes, and reducing the diameter of the welded tubes to the desired diameter of the finished flux-cored wires, using a series of apparatus. Among various types of welding methods employed for joining together the upper edges of the unwelded tubes, high-frequency resistance welding and high-frequency induction welding are particularly popular.

But little study has been made as to the weldability of flux-cored wires whose outer skin is made of tubes whose upper edges are welded together with a flux contained therein. The inventors discovered that spatters expelled when the upper edges of formed tubes are welded together are detrimental. Spattering can be almost rid of by selecting proper welding conditions suited to the size of the steel strip and the speed of forming and tubing. Even then, however, spattering occurs, with individual spatters showing a tendency to increase in size, when the size of the strip changes slightly or the particle size of the flux changes considerably (an increase in the quantity of finer ingredients). Some of the spatters unavoidably fall into and mix with the flux in the unwelded tube, thereby damaging the arc stability, one of the important features of the flux-cored wires, and welding efficiency.

The object of the embodiment to be described hereunder is to provide flux-cored wires with high arc stability and welding efficiency that are obtained by controlling the size of spatters that unavoidably mix with the flux in the course of manufacturing.

In this embodiment, the moisture content of the flux is controlled so that the maximum diameter of the spatters mixing with the flux is kept at and under 0.2 mm. The inventors observed how spatters occurred when the upper edges of unwelded tubes are welded together and studied how the size of spatters mixing with the flux can be controlled by preparing flux-cored wires from the steel strip of the size and chemical composition shown in Table 10 and the flux consisting essentially of $TiO_2$ as shown in Table 11. Spattering resulting from the welding of tube edges following the feeding of flux showed a tendency to increase when the percentage of the finer ingredients in the flux increased. Some of the spatters proved to contain Ti and $TiO_2$ that were not present in the steel strip. Obviously, the Ti and $TiO_2$ stemmed from the rutile sand ($TiO_2$) contained in the flux. This points to the adherence of the flux to the upper edges of the unwelded tube before the upper edges are brought in contact with each other. The inventors considered that the adherence of the flux is ascribable to two causes. One is the flying up of the finer ingredients of the flux when the flux is fed into the unwelded tube from the flux feeder. The other is the flying up of the finer ingredients of the flux that occurs as a result of the weakening of the bonding force of flux particles as a result of an increase in the temperature of the unwelded tube and the flux contained therein resulting from the heating by the high-frequency induction coil near the welding point and under the influence of the slight vibration resulting from the forming and delivery of unwelded tubes. Therefore, the inventors studied measures to control the expelling of spatters by preventing the occurrence of the detrimental phenomena just described.

The Japanese Provisional Patent Publication No. 234795 of 1985 discloses a method of removing the fine powder adhering to the upper edges of unwelded tubes by sucking the powder from outside the tube at a point upstream of the welding point (on the flux feeder side). In the experiment conducted by the inventors, the quantity of spatters showed a tendency to increase when the suction force was increased, though the finer ingredients of the flux that flew up and adhered to the upper edges of the unwelded tube were almost removed. This was due to a strong air stream created by the great enough suction force to remove the fine powder from the upper edges of the formed tube that furthered the flying up of the finer ingredients of the flux near the welding point. With the upper edges half-molten in the vicinity of the welding point, in addition, the strong air stream accelerated the oxidation of the molten iron. The resulting presence of excess oxide in the V-shaped groove inhibited the achievement of stable tube-forming and welding.

The inventors envisaged the need of holding down the flying up of the finer ingredients of the flux because sucking them changes the composition of the flux contained in the wire and thereby inhibits the attainment of the originally intended welding performance. Therefore, the inventors tried to inhibit the flying up of the finer ingredients of the flux by controlling the moisture content thereof. When the moisture content of the flux was kept above a certain level, the flying up of the finer ingredients thereof on being fed from the feeder into the unwelded tube and resulting from the heating near the welding point was almost eliminated. As a consequence, spattering was reduced substantially to the level of flux-free welding. The advantage of preventing the flying up of the finer ingredients of the flux near the welding point, which cannot be achieved by suction, is particularly significant. The moisture content in the flux is considered to exert the following action. The high-frequency induction coil heats the side and bottom of an unwelded tube to about 300° to 500° C., whereby the flux in contact with these portions of the tube is also heated. The water contained in these portions of the flux becomes instantaneously vaporized. The resulting water vapor that fills the space between the particles of the inner flux strengthens the bonding force therebetween and inhibits the flying up of the finer ingredients. As such, only a very small quantity of water is required to be present in the flux. The presence of excess water impedes the stable feed of flux and tends to produce defects in the weld of flux-filled tubes. The residual water in the flux is dried and removed by the initial stage of the subsequent size-reducing process and during the intermediate annealing applied in that process. Therefore, the flux-cored wires thus manufactured exhibit a satisfactory welding performance.

Next studied was the influence of the spatters expelled and mixed with fluxes having varying moisture contents on the welding performance of the manufactured welding wires. Tubes were formed and welded under such conditions as will reduce the expelling of spatters to a minimum. The flux filling ratio was 13.5%. The size of spatters was determined by observing the cross section of wires drawn to the final product diameter (1.2 mm) from the flux-cored tubes cut in the longitudinal direction thereof or in the direction perpendicular thereto or by directly measuring the size of spatters taken out of the samples of the flux collected therefrom.

Figure 25:
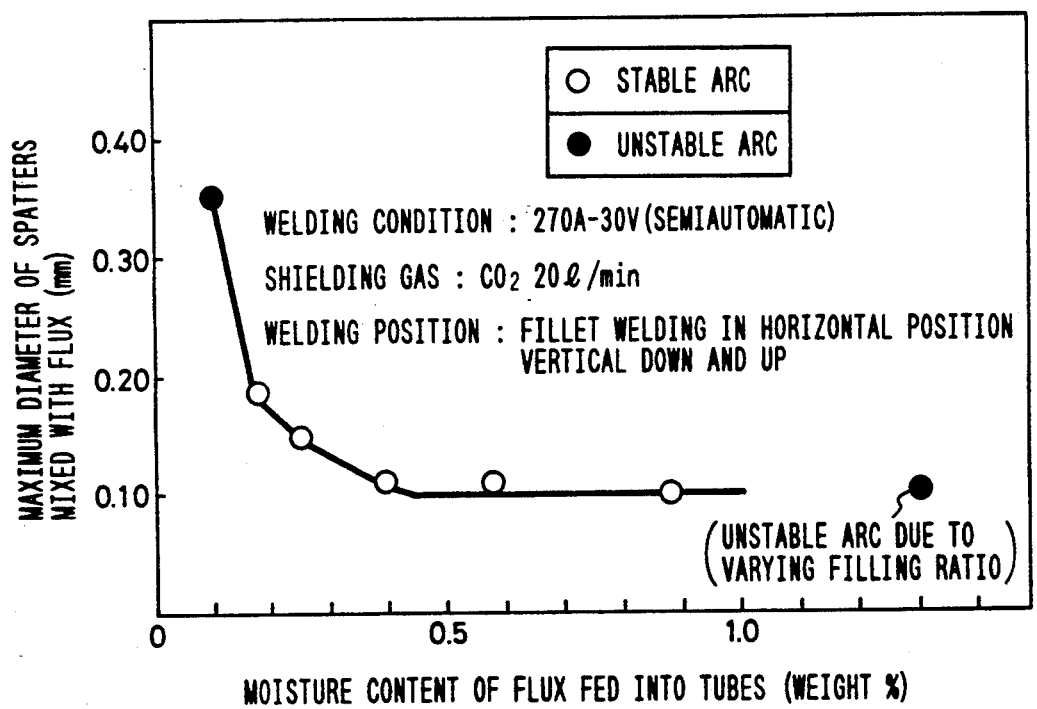
FIG. 25 graphically shows the relationship among the moisture content in the fed flux, maximum diameter of the spatter particles contained in the flux and the stability of electric arcs.

Formed as a result of the rapid cooling and solidification of the molten metal, spatters can be readily distinguished from other materials making up the flux as they substantially maintain their original almost spherical shape because they are harder than the iron particles that are wrought when compressed in the drawing process. Spatters can be distinguished also by applying hardness test or chemical analysis. FIG. 25 shows the relationship between the moisture content in the flux fed into unwelded tubes (determined by applying the gravimetric method to the flux kept at 200° C.), the maximum particle size of the spatters observed in the cross section of wires finished to the diameter of 1.2 mm, and the arc stability of the finished flux-cored wires. As is obvious from FIG. 25, the maximum particle size of the spatters was kept at or below 0.2 mm and good arc stability was obtained when the moisture content in the flux was kept between about 0.15 and 1.0% by weight. When the moisture content in the flux exceeded 1.0% by weight, the arc became unstable while the maximum particle size of the spatters remained at or below 0.2 mm. This was due to the excess moisture content that inhibited the smooth feed of the flux, with a resulting increase in the variation of the flux filling ratio in the longitudinal direction of the finished wires.

The maximum particle size of the spatters mixed with the flux must be kept at or below 0.2 mm in order to obtain good arc stability which is one of the important weldability parameters of flux-cored welding wires. If the maximum particle size of the spatters exceeds 0.2 mm, the tip of the welding wire does not smoothly melt and drip, which results in the impairing of arc stability, expelling of many spatters and forming of ill-shaped beads.

The following paragraphs describe further details of the manufacture of flux-cored wires. Flux-cored tubes (with an outside diameter of 21.7 mm) were made using the steel strip of the size and chemical composition shown in Table 10 and the flux of the composition shown in Table 11 (with the ingredients not coarser than 100 meshes accounting for about 15% by weight). After reducing the diameter by drawing (with two intermediate annealings), the tubes were finished into flux-cored wires having a diameter of 1.2 mm. The size of the expelled spatters was controlled by varying the moisture content in the flux while keeping the strip feed rate and welding condition unchanged at 25.0 m/min. and at 520 kHz and 120 kVA.

TABLE 10

| Specification of Steel Strip | | | | | | | |
|---|---|---|---|---|---|---|---|
| Size (mm) | | Chemical Composition (wt %) | | | | | |
| Thickness | Width | C | Si | Mn | P | S | N |
| 2.0 | 64.0 | 0.05 | 0.01 | 0.30 | 0.008 | 0.003 | 0.0020 |

TABLE 11

Chemical Composition of Materials for Flux (wt %)

| Symbol of Flux | Rutile Sand (TiO$_2$) | Silicon Sand (SiO$_2$) | Zircon Sand (SiO$_2$—ZrO$_2$) | Ferrosilicon Manganese (Fe—Si—Mn) | Ferromanganese (Fe—Mn) | Alumimagnesium Powder (Al—Mg) | Iron Powder | Arc Stabilizer* |
|---|---|---|---|---|---|---|---|---|
| F1 | 41 | 3 | 4 | 18 | 10 | 6 | 9.5 | 8.5 |

*Arc stabilizer: sodium titanate, sodium silicate, etc.

The weldability of the trial wires thus prepared was investigated by using them in a semiautomatic welding tested conducted at 270 A on 30 V, with a gas feed rate of 20 l/min. Table 12 shows the specifications of the trial wires and the results of the welding test on them. As shown in Table 12, good weldability was obtained in Tests Nos. 1, 2 and 4 (on wires Nos. W1, W2 and W4) because the maximum particle size of the spatters mixed with the flux was kept at or under 0.2 mm. By contrast, the arc formed in Test No. 3 (on wire No. W3) was unstable because the maximum particle size of the spatters exceeded 0.2 mm.

TABLE 12

Specification of Trial Wires and Results of Weldabiltiy Test

| Test No. | Symbol of Trial Wire | Diameter (mm$\phi$) | Flux filling Ratio (wt %) | Flux Fed to Tube Being Formed Type | Moisture Content (wt %) | Maximum Diameter of Spatters in Flux (mm) | Weldability (Fillet Welding in Horizontal Position Vertical Down and Up) |
|---|---|---|---|---|---|---|---|
| 1 | W1 | 1.2 | 13.5 | F1 + water | 0.26 | 0.08 | ◯ (Good) |
| 2 | W2 | 1.2 | 13.5 | F1 + water | 0.70 | 0.10 | ◯ (Good) |
| 3 | W3 | 1.2 | 12.0 | F1 | 0.10 | 0.35 | △ (Unstable arc) |
| 4 | W4 | 1.2 | 13.5 | F1 + water | 0.20 | 0.08 | ◯ (Good) |

With the embodiment just described stable arcs and good weldability in various welding positions are obtained by controlling the particle size of the spatters expelled during the manufacturing process of flux-cored closed wires comprising the outer skin of formed tubes and mixed With the flux.

Embodiment IX

The weld metals made by welding with flux-cored welding seamless wires contain more nitrogen than those of similar alloying constituents made by welding with solid wires. The higher nitrogen content lowers the toughness of the weld metal.

The "Method of Manufacturing Flux-Cored Welding Wires" disclosed in the Japanese Provisional Patent Publication No. 21495 of 1984 was intended to offer a solution for the problem of low toughness. The inventors of this method discovered that the higher nitrogen content in the weld metals obtained from flux-cored seamless wires was due to the air contained therein, and invented the above method on the basis of this finding. According to this method, a tube filled with flux is vacuum-sucked to remove air from the space therein. After this vacuum-suction, the flux within the tube is compressed until the porosity in the tube (1-Vn/VO), which is derived from the cubic volume (VO) per unit length of the tube after size reduction by drawing and the total cubic volume (Vn) occupied by the flux particles in the tube, becomes 0.40 or lower. With the reentry of air into the tube thus substantially prevented, an increase in the nitrogen content in the weld metal can be controlled. But the method disclosed in the Japanese Provisional Patent publication No. 21495 of 1984 involved the following problem.

Vacuum-suction of tubes filled with flux necessitates an additional apparatus and complicates the entire manufacturing process. Besides, the vacuum-suction step cannot be incorporated in the continuous process of manufacturing flux-cored wires from steel strips because tubes filled with flux must be vacuum-sucked from one end or both ends thereof. All this pushes up the production cost of flux-cored welding wires.

Now the embodiment described here is intended to provide a method of manufacturing flux-cored welding wires at low cost while preventing the lowering of the toughness of the weld metal. In this method, the first annealing is applied after the diameter of the welded tube has been reduced until the density of the flux contained therein exceeds the tap density thereof.

The diameter of the tube is reduced by rolling and drawing. Annealing is performed at a temperature of, for example, about 680° to 760° C. in the atmosphere or in N$_2$, H$_2$, argon and other similar gases, using a common induction heating, direct electrical heating or other continuous heating furnace. Size reduction and annealing are repeated two to four times. To prevent the entry of air into the size-reduced tube, it is preferable to perform size reduction and the first annealing continuously.

The reason for keeping the flux density above the tap density (the bulk density determined according to DIN 53194) is obtain high low-temperature toughness by preventing an increase in the total nitrogen content in the weld metal.

To prevent an increase in the nitrogen content in the weld metal, it is necessary to minimize the nitrogen content in the seamless welding wire used in welding. The nitrogen contained in the seamless welding wire is present in the tube and the flux filled therein. Furthermore, the nitrogen entrapped when flux is fed into a tube and kept in the voids left between the particles thereof increases greatly as a result of annealing.

The flux contained in the seamless welding wire usually contain considerable quantities of manganese, aluminum and other elements that are likely to become nitrated. During annealing, these elements form nitrides by reacting with the nitrogen in the air entrapped in the voids between the particles of the flux filled in the tube. The nitrogen thus fixed in the wire in the form of nitrides greatly increases the nitrogen content therein.

As a consequence, the nitrogen content in the weld metal, which should preferably be equal to the total nitrogen content in the steel tube and flux filled therein, increases, with a resulting decrease in low-temperature toughness.

The diameter of flux-filled tube in this embodiment is gradually reduced from the leading end thereof. The air in the space within the tube and in the flux is pushed backward (in the direction opposite to the direction of tube travel) as a result of size reduction and leaves the tube through the unwelded opening. When the diameter of the tube is reduced until the flux density therein exceeds the tap density, only very little air remains in the tube. When the quantity of the residual air is slight, only small quantities of iron and manganese in the tube and flux are nitrated by the nitrogen in the air during annealing. Therefore, the nitrogen in the product wire exerts only little influence on the toughness of the weld metal.

Now that the closely compacted flux reduces the reentry of the air into the tube to a minimum, size reduction and the first annealing may be applied discontinuously.

Generally, more iron, manganese, aluminum and other elements are nitrated by the nitrogen in the air as the annealing temperature or time increases. As such, nitration of these elements in the tube and flux is effectively controlled by not allowing the temperature of the tube to exceed 500° C. for more than 20 minutes.

Figure 26:
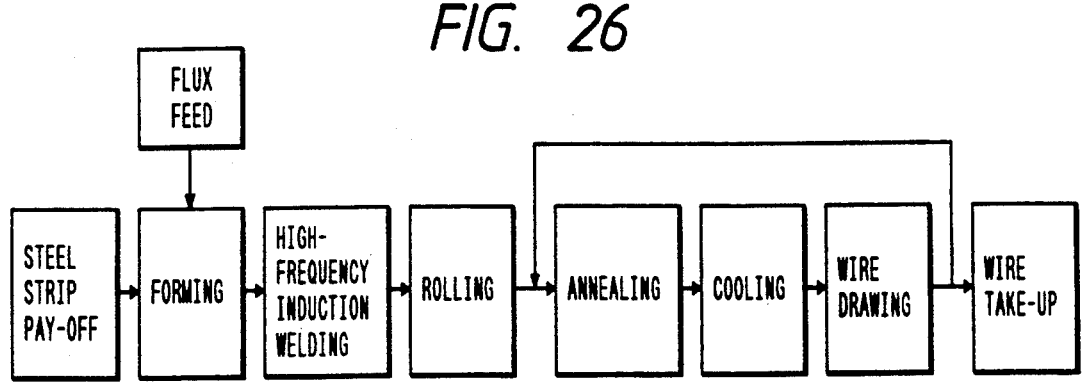
FIG. 26 is a block diagram showing the principal steps of manufacturing flux-cored seamless welding wires.

Now this embodiment will be described by reference to a process block diagram shown in FIG. 26.

The forming rolls formed the steel strip paid off from a reel and fed in the longitudinal direction thereof into an unwelded tube. The strip was of carbon steel according to JIS G 3131, SPHC) having a width of 62.9 mm and a thickness of 2.2 mm, with a nitrogen content of 30 ppm. The strip was formed into a tube having an outside diameter of 21.7 mm at a speed of 30 m/min. A flux of the composition shown in Table 13 was fed into the unwelded tube being processed.

TABLE 13

| Ingredients | Content (%) |
| --- | --- |
| Iron powder | 10 |
| Rutile sand | 46 |
| Silicon sand | 8 |
| Ferrosilicon | 5 |
| Ferromanganese | 8 |
| Siliconmanganese | 19 |
| Others | 4 |

The filling ratio, static bulk density, tap density and nitrogen content of the flux was 12% ±1%, 1.6 g/cm$^3$, 1.9 g/cm$^3$ and 30 ppm, respectively.

The meeting edges of the flux-filled unwelded tube was joined together by a high-frequency induction welder with a heat input of 140 to 150 kVA.

The tube was then rolled through a rolling mill comprising twelve stands of three rolls each. Table 14 shows an example of the rolling schedule.

TABLE 14

| Diameter of Original Tube | 1 | 2 | 3 | 4 | 5 | 6 | 7 | 8 | 9 | 10 | 11 | 12 |
| --- | --- | --- | --- | --- | --- | --- | --- | --- | --- | --- | --- | --- |
| Outside Diameter (mm) | 21.7 | — | 18.36 | — | 14.87 | — | 12.7 | — | 10.7 | — | 9.0 | — | 7.0 |
| Cross-sectional Shape | ◯ | △ | ◯ | △ | ◯ | △ | ◯ | △ | ◯ | △ | ◯ | △ | ◯ |

Figure 27:
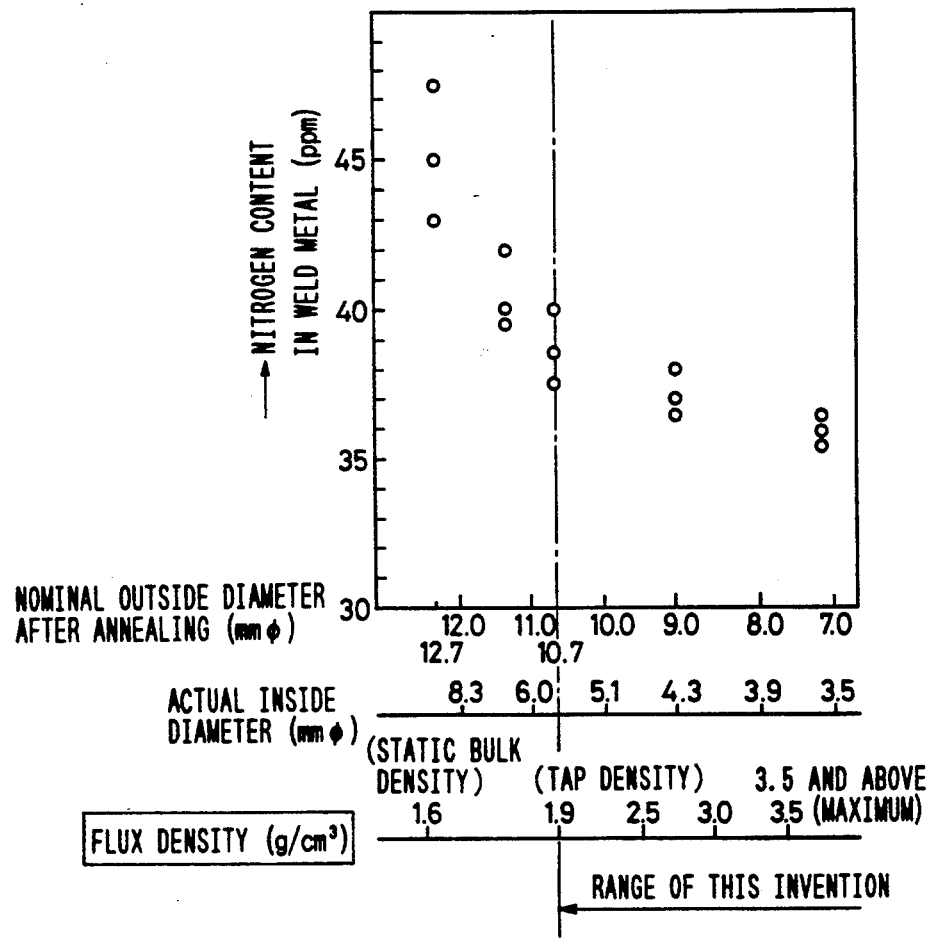
FIG. 27 graphically shows the relationship between the density of flux and the nitrogen content in the weld metal.

Then, several specimens taken from different stages of the rolling process were subjected to repeated annealing, cooling and drawing to the desired product size, and the obtained product wires were coiled up. Annealing was performed in a high-frequency induction heating furnace at 720° C., with the specimens heat to above 500° C. for 200 seconds. The annealed specimens were air-cooled for 15 seconds and then water-cooled. FIG. 27 shows the nitrogen contents in the weld metals formed by the welding performed with the flux-cored wires thus prepared ($CO_2$: 25 l/min., heat input: 270 A-30 V, welding speed: 30 cm/min.).

As is obvious from FIG. 27, the nitrogen content in the weld metal decreased with increasing flux density. An increase in the nitrogen content resulting from the annealing-induced nitration can be controlled when the diameter of the tube is reduced until the flux density becomes higher than the tap density (1.9 g/cm$^3$) because the nitrogen content in the weld metal falls below 40 ppm.

In this embodiment, the diameter of the flux-filled tube is continuously reduced following welding until the flux density exceeds the tap density, thereby sending out air. Elimination of air according to this embodiment, therefore, can be accomplished with the existing apparatus, without necessitating any special discharging unit. Accordingly, flux-cored wires containing only very little nitrogen can be manufactured with ease and at low cost. In addition, a series of continuous steps ranging from tube forming to wire drawing permit efficient manufacture of flux-cored welding wires.

Industrial Applicability

The methods of manufacturing tubes filled with powdery and/or granular substances according to this invention are applicable to the manufacture of tubes of carbon steel, stainless steel, copper alloy, aluminum alloy and other metals filled with welding flux, oxide-based superconductors, steelmaking additives and other powdery and/or granular substances.

We claim:

1. A method of continuously manufacturing tubes filled with a powdery and/or granular substance by forming a metal strip fed in the longitudinal direction thereof into an unwelded tube (1a) with forming rolls (2), feeding a powdery and/or granular substance (F) through an opening in the unwelded tube (1a) being formed, butt welding the fringing edges of the opening, and reducing the diameter of the welded tube (1b) which is characterized in that:

the minimum allowable heat input below which cold cracking occurs and the maximum allowable heat input above which spatters not smaller than 0.83 times the inside diameter of the finished tube are expelled in the butt welding are determined beforehand; and the butt welding is performed with a heat input that is greater than the minimum allowable heat input and smaller than the maximum allowable heat input.

2. A method of manufacturing tubes filled with a powdery and/or granular substance according to claim 1, in which the butt welding is performed with a heat input smaller than the minimum heat input at which spattering begins to be observed.

3. A method of manufacturing tubes filled with a powdery and/or granular substance according to claim 1, in which the substantially nonmagnetic ingredients contained in the powdery and/or granular substance and forming nonmetallic inclusions in the welded joint are granulated, and the granulated ingredients are fed into the unwelded tube (1a).

4. A method of manufacturing tubes filled with a powdery and/or granular substance according to claim 1, in which the welding is performed so that the meeting edges are fused and joined together from the outside to the inside of the tube along a substantially straight line (l) that is inclined at an angle of $\theta$ ($10° < \theta < 90°$) with respect to the axis of the tube.

5. A method of manufacturing tubes filled with a powdery and/or granular substance according to claim 4, in which the forming schedule of the tube (l) is adjusted so that the desired angle of inclination is obtained.

6. A method of manufacturing tubes filled with a powdery and/or granular substance according to claim 1 in which the powdery and/or granular substance (F) is fed into the tube (1) in such a manner as to leave a space (24) along the tube (1) at least up to the welding point (21), and a stream of gas is forcefully shot forth near the welding point (21) to blow the expelled spatters outside the tube (1), with an opening (22) near the welding point (21) shielded from the side of the space thus left.

7. A method of manufacturing tubes filled with a powdery and/or granular substance according to claim 1 in which the powdery and/or granular substance (F) is fed into the tube (1) in such a manner as to leave a space (24) along the tube (1) at least up to the welding point (21), and the spatters are drawn from near the welding point (21) through a suction tube (45) that extends through the space (24) along the tube (1) and discharged outside the tube (1) upstream of the welding point (21).

8. A method of manufacturing tubes filled with a powdery and/or granular substance according to claim 1 in which accretions on the fringing edges of the unwelded opening (22) in the formed tube are wiped off just ahead of the welding point (21).

9. A method of manufacturing tubes filled with a powdery and/or granular substance according to claim 8, in which a fabric belt (64) is fed from a feed bobbin (67) to a push roll (65) that pushes the fabric belt (64) into an opening (22) just ahead of the welding point (21) and brings the fabric belt (64) in contact with the fringing edges of the opening and a take-up bobbin (70) coils up the fabric belt (64) thus pushed in.

10. A method of manufacturing tubes filled with a powdery and/or granular substance according to claim 1 in which the fringing edges of an opening extending in the longitudinal direction of the tube are joined together by high-frequency induction welding that is applied by use of an induction heating coil (9) that surrounds the tube (1) with a space (77) left therebetween, and a stream of gas is passed through the space (77) between the induction heating coil (9) and tube (1) to remove the magnetic powder from the space (77).

11. A method of manufacturing tubes filled with a powdery and/or granular substance according to claim 10, in which an insulating shielding member (84, 85) is disposed between the induction heating coil (9) and the tube (1) and a stream of gas is passed through the space (77) between said shielding member (84, 85) and tube (1).

12. A method of manufacturing tubes filled with a powdery and/or granular substance according to claim 1 in which the powdery and/or granular substance (F) comprises a flux for gas-shielded arc welding and the moisture content of the flux is controlled so that the maximum diameter of the spatters mixing with the flux is kept at and under 0.2 mm.

13. A method of manufacturing tubes filled with a powdery and/or granular substance according to claim 1 in which the powdery and/or granular substance (F) comprises a welding flux, the diameter of the tube (1) is reduced following welding until the flux density in the tube (1) becomes higher than the tap density thereof, and the first annealing is applied after the reduction of the tube diameter.

* * * * *